(12) United States Patent
Salehi et al.

(10) Patent No.: US 11,637,367 B2
(45) Date of Patent: Apr. 25, 2023

(54) GRADIENT PERMITTIVITY FILM

(71) Applicant: 3M INNOVATIVE PROPERTIES COMPANY, St. Paul, MN (US)

(72) Inventors: Mohsen Salehi, Woodbury, MN (US); Stephen J. Etzkorn, Woodbury, MN (US); Jaewon Kim, Woodbury, MN (US); Brett J. Sitter, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 301 days.

(21) Appl. No.: 17/045,559

(22) PCT Filed: Apr. 5, 2019

(86) PCT No.: PCT/US2019/026106
§ 371 (c)(1),
(2) Date: Oct. 6, 2020

(87) PCT Pub. No.: WO2019/195758
PCT Pub. Date: Oct. 10, 2019

(65) Prior Publication Data
US 2021/0159591 A1    May 27, 2021

Related U.S. Application Data

(60) Provisional application No. 62/774,997, filed on Dec. 4, 2018, provisional application No. 62/654,151, filed on Apr. 6, 2018.

(51) Int. Cl.
*H01Q 1/42* (2006.01)
*H01Q 1/32* (2006.01)
(Continued)

(52) U.S. Cl.
CPC ............. *H01Q 1/424* (2013.01); *B32B 5/022* (2013.01); *B32B 7/025* (2019.01); *B32B 7/12* (2013.01);
(Continued)

(58) Field of Classification Search
CPC ........... B32B 5/022; B32B 7/025; B32B 7/12; B32B 17/10; B32B 27/08; B32B 27/12; H01Q 1/421
See application file for complete search history.

(56) References Cited

U.S. PATENT DOCUMENTS

| 3,441,933 A | 4/1969 | Tuinila |
| 4,767,726 A | 8/1988 | Marshall |
(Continued)

FOREIGN PATENT DOCUMENTS

| CN | 103247851 A | * 8/2013 |
| CN | 103247851 A | 8/2013 |
(Continued)

OTHER PUBLICATIONS ip.com translation of CN103247851A (Year: 2022).*
(Continued)

*Primary Examiner* — Michael Zhang

(57) ABSTRACT

A gradient permittivity film comprises (a) a first permittivity layer comprising a first continuous matrix of a first material having a first relative permittivity ($\varepsilon_{r1}$) and a second component having a second relative permittivity ($\varepsilon_{r2}$) dispersed in the first continuous matrix, the first permittivity layer having a first effective layer relative permittivity ($\varepsilon_1$) and a thickness ($T_1$); and (b) a second permittivity layer having a second effective layer relative permittivity ($\varepsilon_2$) and a thickness ($T_2$) disposed on the first permittivity layer $T_1=0.8(t_1)$ to $1.2(t_1)$, where $t_1=(I)$; $T_2=0.8(t_2)$ to $1.2 (T_2)$, where $T_2=(II)$.
(Continued)

$$t_1 = \frac{c}{4f\sqrt{\varepsilon_1}} \qquad (I)$$

$$t_2 = \frac{c}{4f\sqrt{\varepsilon_2}} \qquad (II)$$

46 Claims, 13 Drawing Sheets

(51) Int. Cl.
    *B32B 7/025*     (2019.01)
    *B32B 27/08*     (2006.01)
    *B32B 7/12*     (2006.01)
    *B32B 5/02*     (2006.01)
    *B32B 27/12*     (2006.01)
    *B32B 17/10*     (2006.01)

(52) U.S. Cl.
    CPC .............. *B32B 17/10* (2013.01); *B32B 27/08* (2013.01); *B32B 27/12* (2013.01); *H01Q 1/3283* (2013.01); *H01Q 1/421* (2013.01)

(56) References Cited

U.S. PATENT DOCUMENTS

| | | |
|---|---|---|
| 5,134,421 A | 7/1992 | Boyd |
| 5,528,254 A | 6/1996 | Howng |
| 6,406,783 B1 | 6/2002 | Phillips |
| 6,433,936 B1 | 8/2002 | Carpenter |
| 10,302,823 B2 * | 5/2019 | Kolb .................... G02B 5/0247 |
| 2006/0003598 A1 | 1/2006 | Li |
| 2006/0109124 A1 | 5/2006 | Dixon |
| 2010/0078198 A1 | 4/2010 | Harris |
| 2014/0159976 A1 | 6/2014 | De Rochemont |
| 2015/0380824 A1 | 12/2015 | Tayfeh Aligodarz |
| 2016/0005552 A1 | 1/2016 | Blum |
| 2016/0109971 A1 | 4/2016 | Harada |
| 2021/0021050 A1 * | 1/2021 | Kim ..................... H01Q 1/3283 |
| 2021/0028538 A1 * | 1/2021 | Jesme ................... H01Q 1/421 |

FOREIGN PATENT DOCUMENTS

| | | |
|---|---|---|
| JP | 54-83741 | 7/1979 |
| WO | WO 2014-187605 | 11/2014 |
| WO | WO 2018-081394 | 5/2018 |
| WO | WO 2019-193571 | 10/2019 |

OTHER PUBLICATIONS

Altair, "Automotive Radars—Antenna Design, Integration & Channel Modeling", A White Paper from Altair Engineering, Inc. (www.altair.com) May 2016, 3 pages.
Fitzek, "Automotive Radome Design—Fishnet Structure for 79 GHz", Proc. German Microwave Conference (GeMIC), 2010, pp. 146-149.
Fitzek, "Comparison of Matching Layers for Automotive Radome Design", Advances in Radio Science (ARS), 2010, vol. 8, pp. 49-54.
International Search Report for PCT International Application No. PCT/IB2019/052829, dated Aug. 29, 2019, 2 pages.
International Search Report for PCT International Application No. PCT/US2019/026106, dated Jul. 5, 2019, 3 pages.
Reuven, "Sandwich Radomes", Radome Electromagnetic Theory and Design, Apr. 10, 2018, pp. 15-38.
Supplementary European Search Report for EP Application No. 19781467, dated Dec. 22, 2021, 2 pages.

* cited by examiner

GRADIENT PERMITTIVITY FILM

CROSS REFERENCE TO RELATED APPLICATIONS

This application is a national stage filing under 35 U.S.C. 371 of PCT/US2019/026106, filed Apr. 5, 2019, which claims the benefit of Provisional Application No. 62/654,151, filed Apr. 6, 2018 and Provisional Application No. 62/774,997, filed Dec. 4, 2018, the disclosure of which is incorporated by reference in its/their entirety herein.

FIELD OF THE INVENTION

The present invention relates to gradient permittivity films useful, for example, in systems with radio wave generating and receiving units.

BACKGROUND

Radio waves may be reflected at a sharp boundary between air and a material having a higher relative permittivity. Such reflection may not be desirable in certain applications.

SUMMARY

Briefly, in one aspect, the present invention provides a gradient permittivity film comprising (a) a first permittivity layer comprising a first continuous matrix of a first material having a first relative permittivity ($\varepsilon_{r1}$) and a second component having a second relative permittivity ($\varepsilon_{r2}$) dispersed in the first continuous matrix, the first permittivity layer having a first effective layer relative permittivity ($\varepsilon_1$) and a thickness ($T_1$); and (b) a second permittivity layer having a second effective layer relative permittivity ($\varepsilon_2$) and a thickness ($T_2$) disposed on the first permittivity layer; wherein the gradient permittivity film has a haze greater than 50% or a transmission of visible light less than 50%; and wherein:

$\varepsilon_1$ is greater than $\varepsilon_2$ by at least 10% for at least one frequency (f) within a frequency range between 20 GHz and 300 GHz, $\varepsilon_1 = 1.1$ to 10

$\varepsilon_2 = 1.11$ to 10

$T_1 = 0.8(t_1)$ to $1.2(t_1)$, where $t_1 = \dfrac{c}{4f\sqrt{\varepsilon_1}}$ $T_2 = 0.8(t_2)$ to $1.2(t_2)$, where $t_2 = \dfrac{c}{4f\sqrt{\varepsilon_2}}$ $\varepsilon_{r1}$ is greater than $\varepsilon_{r2}$ for the frequency $f$.

In another aspect, the present invention provides A gradient permittivity film comprising (a) a first permittivity layer comprising a first continuous matrix of a first material having a first relative permittivity ($\varepsilon_{r1}$) and a second component having a second relative permittivity ($\varepsilon_{r2}$) dispersed in the first continuous matrix, the first permittivity layer having a first effective layer relative permittivity ($\varepsilon_1$) and a thickness ($T_1$); and (b) a second permittivity layer having a second effective layer relative permittivity ($\varepsilon_2$) and a thickness ($T_2$) disposed on the first permittivity layer; wherein the gradient permittivity film has a haze greater than 50% or a transmission of visible light less than 50%; and wherein:

$\varepsilon_1$ is greater than $\varepsilon_2$ by at least 10% for at least one frequency (f) within a frequency range between 20 GHz and 300 GHz, $\varepsilon_1 = 1.1$ to 10

$\varepsilon_2 = 1.11$ to 10

$T_1 = 0.8(t_1)$ to $1.2(t_1)$, where $t_1 = \dfrac{c}{2f\sqrt{\varepsilon_1}}$ $T_2 = 0.8(t_2)$ to $1.2(t_2)$, where $t_2 = \dfrac{c}{4f\sqrt{\varepsilon_2}}$ $\varepsilon_{r1}$ is greater than $\varepsilon_{r2}$ for the frequency $f$.

DETAILED DESCRIPTION

Figure 1:
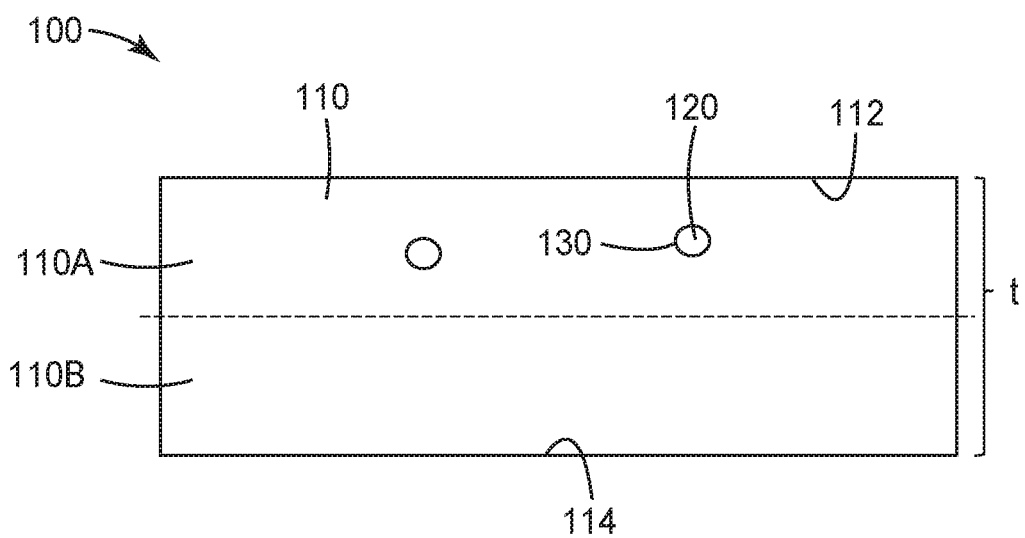
FIG. 1 is a side elevation cross section of a gradient permittivity film.

Radio wave generating and receiving units, such as radar (radio detection and ranging) units, may be useful in a diverse and growing application space. For example, as automobiles incorporate more and more sensors to enhance driver safety, sense and warn about vehicle surroundings and ambient conditions, and enable partial or full autonomous driving functions, one or more radar units may be incorporated. For automotive radar applications, microwave generation and receiving units may be used, and so for purposes of this application "radar" and "radio waves" shall include microwave range frequencies as well. For power consumption, safety, and regulatory reasons, these radar units may be relatively low power when compared to those used for, as an example, air traffic monitoring applications. Accordingly, the signal to noise ratios of these lower power units may be more sensitive to interference or attenuation.

In order to protect these radar units from dirt buildup or weather elements such as snow and rain, or, in the case of rotating or moving components, to protect people from injury or accidental damage, the unit is typically protected with a cover. In some cases, this protective cover is referred to as a radome. Alternatively, or additionally, these units are sometimes embedded within the body of the vehicle. In some embodiments, these units are placed behind or within the bumper fascia or another vehicle fascia, which serves as the protective cover. Depending on the direction of interest, these radar units can be placed at any location on the vehicle. Typically, they are arranged so that the least amount of material is disposed between the radar unit and its potential—or intended-targets for detection.

However, because a protective cover is typically necessary or desirable to use in conjunction with these radar units, the radio waves generated by a radio wave generating unit and received by a radio wave receiving unit must pass through an interface including a sudden increase in electrical permittivity. Relative permittivity for a given frequency, which, as used herein is the ratio of a material's permittivity to the permittivity of a vacuum, measures the resistance of a material to forming an electric field within itself. Sharp changes in this value—as would be encountered by a radio wave traveling in air at an interface with a non-air material, such as a plastic vehicle fascia, will cause at least some of the radio wave to be reflected at this boundary. Since these boundaries occur twice for each pass through the vehicle fascia (once entering the material and once exiting the material), the losses represented by reflections in a non-desirable direction (for radio waves generated by the radio wave generating unit, back toward the radio wave generating unit, and for radio waves to be received by the radio wave receiving unit, back away from the radio wave receiving unit), the losses can become significant and make the signal less effective. Specifically, this can happen either because a returning signal is significantly attenuated before being detected by the radio wave receiving unit or because a transmitted signal is reflected and detected, giving a strong false signal, either mechanism reducing the ability to discern a desirable signal from noise. Similarly, antennas for telecommunications or, indeed, for any electronic device including a transmitting and receiving unit may encounter the same or similar problems; i.e., signal losses or noise increases attributable to a sharp transition between medium permittivity.

Gradient permittivity films—analogous to anti-reflection films or coatings for optical interfaces, provide a smooth or stepped change in permittivity (versus a smooth or stepped change in refractive index for anti-reflection films)—from a first medium to a second medium. Typically, the gradient permittivity film's permittivity varies from being closest to the permittivity of the first medium to being closest to the permittivity of the second medium. For example, the gradient permittivity film could have a varying permittivity that starts close to the permittivity of air on one side and transitions to the permittivity of a plastic vehicle fascia on the other side (which would be attached to the plastic vehicle fascia). This smooth or stepped transition can significantly reduce the dielectric boundary reflection that otherwise occurs at these sharp transitions.

Previous gradient permittivity films typically use varying bulk three-dimensional shapes, such as cones or pyramids. However, in a typical use environment where these films may be exposed to dirt accumulation and weather conditions, these films may become contaminated and ineffective, because they rely on the presence of air in order to provide the gradient in permittivity. Films described herein may be less susceptible to debris and contaminant ingress because a limited portion of the air or gas fraction is exposed to external elements, or in some embodiments, the gas volume fraction is completely sealed within the film. In other words, both major surfaces of the gradient permittivity film are primarily a continuous matrix component.

All references herein to the permittivity of a material are to the relative permittivity of the material (i.e., its permittivity expressed as a ratio relative to the permittivity of vacuum.

FIG. 1 is a side elevation cross section of a gradient permittivity film. Gradient permittivity film 100 includes first half 110A closest to first major surface 112, second half 110B closest to second major surface 114, continuous matrix of first component 110, with second component 120 disposed within the continuous matrix and also disposed within third component 130. The thickness of the film is indicated by t and includes both halves of the gradient permittivity film. Gradient permittivity film 100 represents a simple embodiment of a gradient permittivity film. In the embodiment of FIG. 1, the continuous matrix is a bulk volume of the first component. In some embodiments, this first component could be a resin, plastic, polymeric material or any other suitable material selected for its permittivity, mechanical properties, thermal or environmental stability, ease of processing, or any combination of the preceding. In some embodiments, the continuous matrix of the first component is selected to match the permittivity and or composition of a material it is intended to be attached to for its designed application.

The first continuous matrix of the first component has a first relative permittivity $\varepsilon_{r1}$. The second component has a second relative permittivity $\varepsilon_{r2}$, where $\varepsilon_{r1}$ is greater than $\varepsilon_{r2}$ for at least one frequency within a frequency range. In some embodiments, the frequency range may be any frequency range within the radio and microwave wavelength range. In some embodiments, the frequency range may be between 20 GHz and 300 GHz. In some embodiments, the frequency range may be between 20 GHz and 100 GHz. In some embodiments, the frequency range may be between 20 GHz and 81 GHz. In some embodiments, the frequency range may be between 76 GHz and 81 GHz. In some embodiments, the frequency range may be between 20 GHz and 30 GHz.

In some embodiments, the second component is air or another inert gas. In some embodiments, the second component is a partial vacuum. Given the low relative permittivity of air, gasses, or partial vacuums, the inclusion of the second component within the gradient permittivity film lowers the effective permittivity of that portion of the film. Averaged over the volume for that portion of the thickness, a half or portion of gradient permittivity film 100 that includes more of second component 120 will have a lower effective permittivity than a half or portion of gradient permittivity film 100 that contains less or none of second component 120. In some embodiments, this difference in permittivity is at least 10%. First half 110A, which is designed to have a lower permittivity than second half 110B, includes second component 120 disposed within continuous matrix of first component 110, while second half 110B does not include second component 120.

Note that in the illustration of FIG. 1 gradient permittivity film 100 is represented as a single layer. Through certain manufacturing methods (described in more detail elsewhere in this description), it is possible to achieve a single layer film that has a gradient in permittivity.

Second component 120 is disposed within third component 130, in the illustration of FIG. 1. In some embodiments, second component 120 is freely disposed within the continuous matrix of the first component—such as in the form of air or gas bubbles. In some embodiments, nanoparticles such as silsesquioxane nanoparticles can be used to add porosity to a polymer layer, such as an epoxy or silicone layer.

However, in some embodiments, second component 120 is disposed within a different material. For example, in some embodiments, second component 120 is disposed within glass, making the spheres in FIG. 1 glass bubbles or microbubbles. Glass microbubbles are generally formed by simultaneous fusion of glass-forming components and the expansion of the fused mass. See generally U.S. Pat. No. 4,767,726 (Marshall). Similarly, polymeric or plastic microbubbles (such as polyethylene, polypropylene, poly (methyl methacrylate) and filled with an inert gas or air may be used. In some embodiments, cenospheres—lightweight spheres typically formed from silica or alumina and filled with air or other inert gas and produced as a byproduct of coal combustion—may be used. In some embodiments, particles such as expandable microspheres can be used to add porosity to a polymer layer. Expandable microspheres can be incorporated in a polymer component and expand upon the application of heat to form a low density volume in a continuous matrix. In some embodiments, ceramic particles may be used. These ceramic particles may be porous and include air or another inert gas. In some embodiments, any of the particles described herein may be coated with or may include an absorber composite. The absorber composite may include at least one of ceramic filler materials, conductive filler materials, or magnetic filler materials. The conductive filler materials may include, for example, carbon black, carbon bubbles, carbon foam, graphene, carbon fibers, graphite, carbon nanotubes, metal particles, metal nanoparticles, metal alloy particles, metal nanowires, polyacrylonitrile fibers, or conductive coated particles. The ceramic material fillers may include, for example, cupric oxide or titanium monoxide. The magnetic filler materials may include, for example, Sendust, carbonyl iron, permalloy, ferrites, or garnets. The third component has a third relative permittivity $\varepsilon_{r3}$, and $\varepsilon_{r2} \leq \varepsilon_{r3}$ for the frequency within the frequency range. Any combination or blend of particles and free voids or bubbles can be used within the continuous matrix of the first component.

The thickness t may be any suitable value, taking into account physical robustness and environmental stability (such as resistant to heat-cool cycle warping). Additionally, the suitable thickness may also be bounded as being greater than a minimum thickness so that a radio wave experiences and interacts with the intermediate change in permittivity. If the thickness is too thin, an incident electromagnetic wave will not interact with the gradient permittivity film. Or, in the case of multilayer gradient permittivity films, an electromagnetic wave will interact with the multilayer gradient permittivity film as if it were a single layer of a blended effective permittivity—instead of, as desired, as a film of stepped permittivity. If a film is too thick, it may not be effectively attached or may not remain attached to a surface and may be less flexible or conformable than desired.

In some embodiments, the layer permittivity may not be homogeneous through the layer volume. The distribution of the second component or its volume fraction within the continuous matrix may vary along one or more non-thickness directions of the film. In some embodiments, the variation may be monotonic. In some embodiments, due to the requisite size and distribution of second component within the continuous matrix of the first component, gradient permittivity films as described herein may have high visible haze or low visible light transmission. In some embodiments, visible haze may be greater than 50%. In some embodiments, visible light transmission may be less than 50%.

Figure 2:
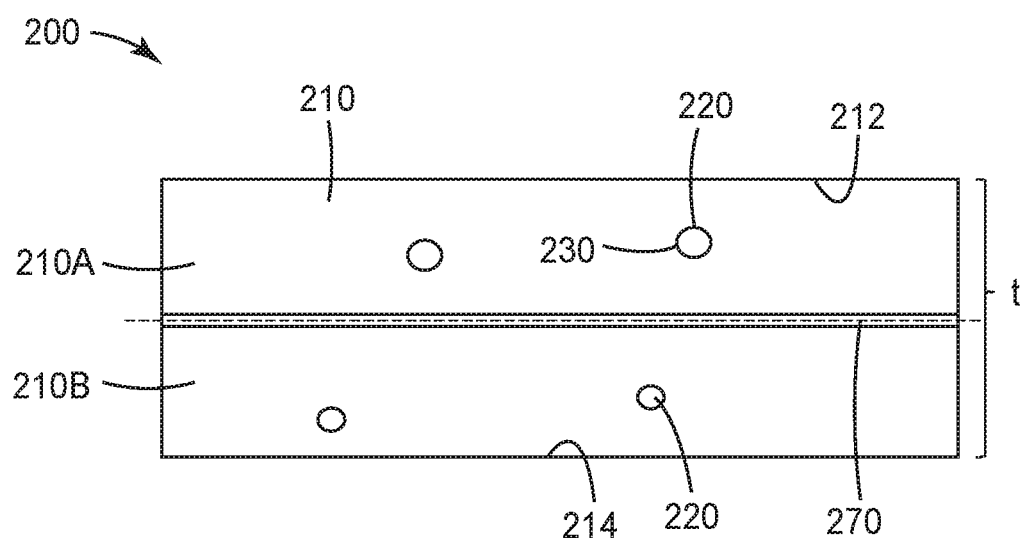
FIG. 2 is a side elevation cross section of another gradient permittivity film.

FIG. 2 is a side elevation cross section of another gradient permittivity film. Gradient permittivity film 200 includes first half 210A closest to first major surface 212 and second half 210B closest to second major surface 214 and laminated together by adhesive 270, continuous matrix of first component 210. with second component disposed within the continuous matrix and optionally disposed within third component 230. Gradient permittivity film 200 in FIG. 2 is similar and corresponds generally to gradient permittivity film 100 of FIG. 1. However, FIG. 2 illustrates two portions of film—first half 210A and 210B—that are laminated to each other by adhesive 270 instead of the unitary construction in FIG. 1. Further, FIG. 2 illustrates that second component 220 can be freely disposed within continuous matrix of first component 210 and not within a third component. In the gradient permittivity films described herein, the volume fraction of the second component may vary between any of the portions of the thickness of the gradient permittivity film through either changing either the size, shape, or density of the bubbles, voids, or other components, such as glass microbubbles, expandable microspheres, or cenospheres present in the continuous matrix. In some embodiments, this difference in volume fraction of the second component is at least 10% between the two halves.

Any suitable adhesive may be used as adhesive 270. For example, pressure sensitive adhesives, UV-curable adhesives, silicone-based adhesives, urethane-based adhesives or any other suitable adhesive or combination of adhesives may be used to bond the halves of gradient permittivity film 200 together. While adhesive of any thickness may be used, using a thin adhesive (thickness<☐/5) may be preferred to have as little influence as possible on the permittivity of the film's stack design.

Figure 3:
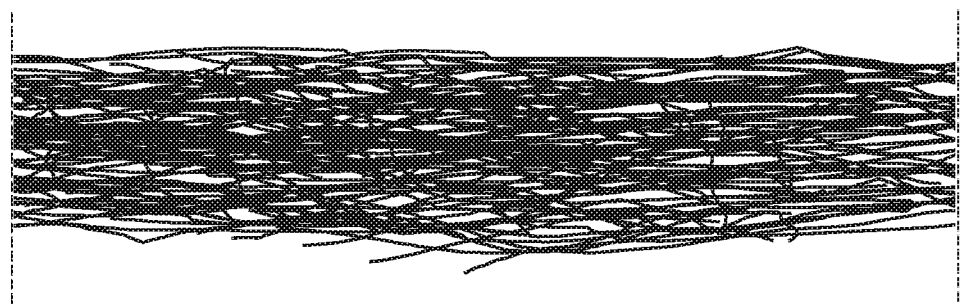
FIG. 3 is a side elevation cross section of a nonwoven component for a gradient permittivity film.

FIG. 3 is a side elevation cross section of a nonwoven component 300 for a gradient permittivity film. Nonwoven component 300 has intrinsic porosity and contains at least some inert gas (e.g., air) volume fraction provided within the continuous matrix of the nonwoven component. A gradient permittivity film may use a nonwoven component as part of a multilayer stack, wherein the film varies in effective permittivity by controlling or selecting the porosity of the various layers of the nonwoven component. In some embodiments, the porosity of a single nonwoven layer can be controlled along the thickness direction such that a gradient in permittivity is present. Suitable nonwoven components may include spunbond nonwovens, flashspun nonwovens, melt-blown nonwovens, staple fiber nonwovens, and may include glass or plastic fibers. In some embodiments, the glass or plastic fibers can themselves contain an inert gas or air component, which may help further tune or control the permittivity gradient along the thickness direction or possibly also in one or more non-thickness directions. Nonwoven components may be used in combination with any other layer described herein, including with one or more layers of a resin matrix with voids or bubbles (plastic or glass or free) disposed therein. Alternatively, and especially in the case of glass or polymer fibers including voids or microbubbles, such fibers can be woven or arranged to form a gradient permittivity film.

Figure 4:
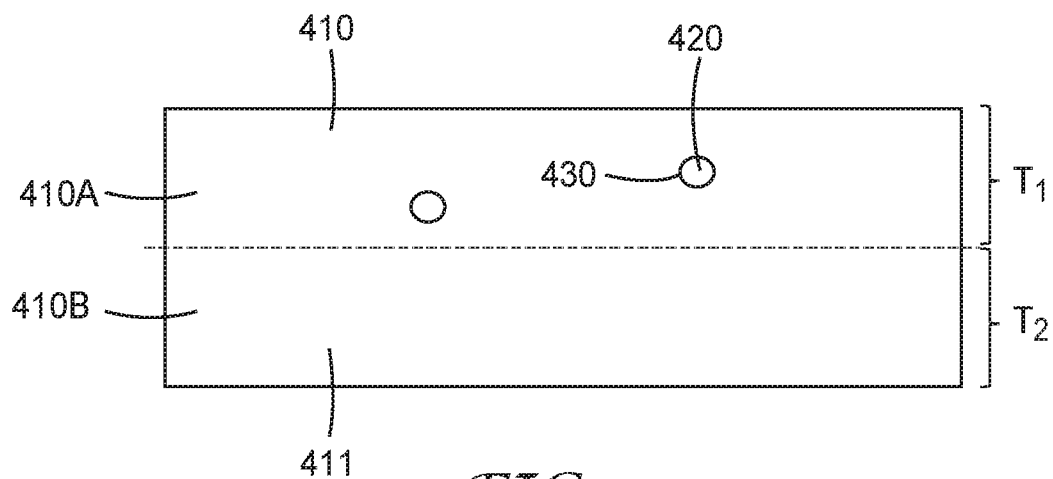
FIG. 4 is a side elevation cross section of a gradient permittivity tape.

FIG. 4 is a side elevation cross section of another gradient permittivity film. Gradient permittivity film 400 includes first permittivity layer 410A and second permittivity layer 411B. First permittivity layer 410A comprises continuous matrix of material 410 with second component 420 disposed within the continuous matrix and also disposed within optional third component 430. The thickness of first permittivity layer 410A is indicated by $T_1$. First permittivity layer 410A can comprise any of the materials described above.

Second permittivity layer 411B comprises material 411. The thickness of second permittivity layer 411B is indicated by $T_2$. In some embodiments, second permittivity layer 411B comprises a continuous matrix of material with a second component disposed within the continuous matrix and also disposed within an optional third component. Second permittivity layer 411B can comprise any of the materials described above. In some embodiments, second permittivity layer 411B is an adhesive. Useful adhesives include acrylic foam adhesives such as double-sided acrylic foam 3M™ VHB™ Tapes available from 3M Company.

First permittivity layer 410A has an effective permittivity $\varepsilon_1$. Second permittivity layer 411B has an effective permittivity $\varepsilon_2$, where $\varepsilon_1$ is greater than $\varepsilon_2$ for at least one frequency within a frequency range.

In certain embodiments, the thickness of the permittivity layers may be controlled to a certain portion of a wavelength within the material of a desired frequency. In this way, interference effects may also be used to reduce undesired reflections as described below.

The standing wave in a medium is proportional to the reflection coefficient. An approach to lower the reflection is to minimize the contrast between two media. For instance, if reflection occurs at air-dielectric interface, a smaller dielectric constant (close to one) generates a smaller reflection.

A different approach is to introduce a set of out-of-phase electric fields in order to cancel out the reflecting fields. Reflection coefficient for a boundary in where incident wave travels through medium 1 (with impedance $\eta_1$) and hits the medium 2 (with impedance $\eta_2$) can be expressed as:

$$\Gamma=(\eta_2-\eta_1)/(\eta_2+\eta_1) \quad \text{(eqn. 1)}$$

Therefore, the reflection phase can change sign (180 degree phase difference) if two media are swapped. This means if we have a dielectric slab with a thickness, reflection coefficient at the air-dielectric boundary has a 180 degree phase difference with reflection coefficient at dielectric-air interface. In order to maintain the phase difference to stay at 180 degree, the portion of field that penetrates into the slab and impinges on the dielectric-air boundary and returns back to the air-dielectric interface and combines with original reflection field, should travel a distance equal to an integer multiplication of wavelength which corresponds to the particular radar frequency for the application. This means the smallest thickness for the dielectric slab is "half-wavelength." This concept can be used, for example, to minimize the reflection from the surface of vehicle fascia when radar signal propagates in normal direction to the vehicle fascia.

In some embodiments, preferred combinations of layer thicknesses and permittivity offer improved functional robustness by using optimized quarter- and half-wavelength interference structures analogous to optical interference layers. By proper selection of each layer thickness and permittivity, the relative phase and amplitude of reflection from each layer boundary may be selected to provide maximum bandwidth for destructive interference for all reflected waves. In particular, for quarter-wavelength interference structures, it can be advantageous to have multiple (e.g., 1, 2, 3, 4 or more) adjacent layers of quarter-wavelength thickness at different permittivity to create a stack with wider bandwidth coverage.

One embodiment includes an anti-reflection (AR) film comprised of two quarter-wavelength layers where their respective permittivity is chosen relative to the geometric mean of the air and bumper fascia permittivity, $\varepsilon_{center}$, as expressed in equation 2.

$$\varepsilon_{center}=\sqrt{\varepsilon_{air} \times \varepsilon_{bumper}} \quad \text{(eqn. 2)}$$

In this example, the permittivity for the first quarter-wavelength layer, exposed to air, has permittivity $\varepsilon_1$, chosen to satisfy equation 3.

$$\varepsilon_1=\sqrt{\varepsilon_{air} \times \varepsilon_{center}} \quad \text{(eqn. 3)}$$

And permittivity $\varepsilon_2$, chosen to satisfy equation 4.

$$\varepsilon_2=\sqrt{\varepsilon_{center} \times \varepsilon_{bumper}} \quad \text{(eqn. 4)}$$

The corresponding thicknesses for each of the quarter-wavelength layers depends on their permittivity by the relationship of equation 5

$$\text{quarter-wavelength thickness} = \frac{c}{4f\sqrt{\varepsilon_r}} \quad \text{(eqn. 5)}$$

Where $\varepsilon_r$ is the respective layer permittivity, f is the wave frequency and c is the speed of light constant.

For the case of common fascia thickness (2.0 to 3.0 mm) the optimum values of the permittivity and thickness for the first and second quarter-wavelength structure is given in Table 1. In certain applications, it will be appreciated that a large degree of robustness will be required in the layers. For these cases, it may be advantageous to limit the air to polymer ratio for stability, thus providing a lower limit to the permittivity.

TABLE 1

Optimized values at a target frequency of 77 GHz for the permittivity of a stacked quarter-wavelength structure for various permittivity fascia.

| Fascia Permittivity | 1st QW layer ε (thickness) | 2nd QW layer ε (thickness) |
| --- | --- | --- |
| 2 | 1.189 (893 μm) | 1.682 (751 μm) |
| 2.2 | 1.128 (883 μm) | 1.806 (725 μm) |
| 2.4 | 1.245 (873 μm) | 1.928 (701 μm) |
| 2.6 | 1.27 (864 μm) | 2.048 (681 μm) |
| 2.8 | 1.294 (856 μm) | 2.165 (662 μm) |
| 3 | 1.316 (849 μm) | 2.28 (645 μm) |

Table 2 shows such a case where the permittivity of the first quarter-wavelength layer was limited to a value of 1.45. In this scenario, only the second quarter-wavelength layer was allowed to vary to optimize the reflectance.

TABLE 2

Optimized values at a target frequency of 77 GHz for the permittivity of a stacked quarter-wavelength structure for the various permittivity fascia, with the restriction that the first layer may not have permittivity below 1.45.

| Fascia Permittivity | 1$^{st}$ QW layer ε (thickness) | 2$^{nd}$ QW layer ε (thickness) |
|---|---|---|
| 2 | 1.45 (809 μm) | 2.0 (689 μm) |
| 2.2 | 1.45 (809 μm) | 2.149 (664 μm) |
| 2.4 | 1.45 (809 μm) | 2.245 (650 μm) |
| 2.6 | 1.45 (809 μm) | 2.337 (637 μm) |
| 2.8 | 1.45 (809 μm) | 2.425 (625 μm) |
| 3 | 1.45 (809 μm) | 2.51 (615 μm) |

Figure 5:
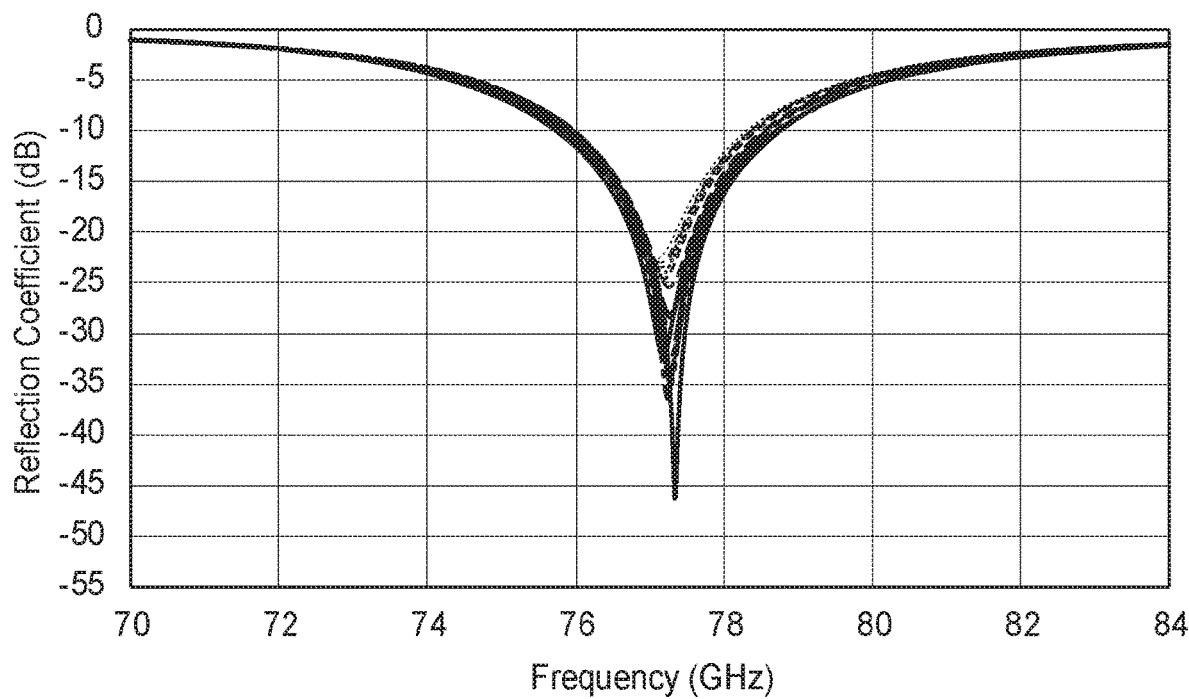
FIG. 5 shows modeling results of a two-layer stacked quarter-wavelength film.
Figure 6:
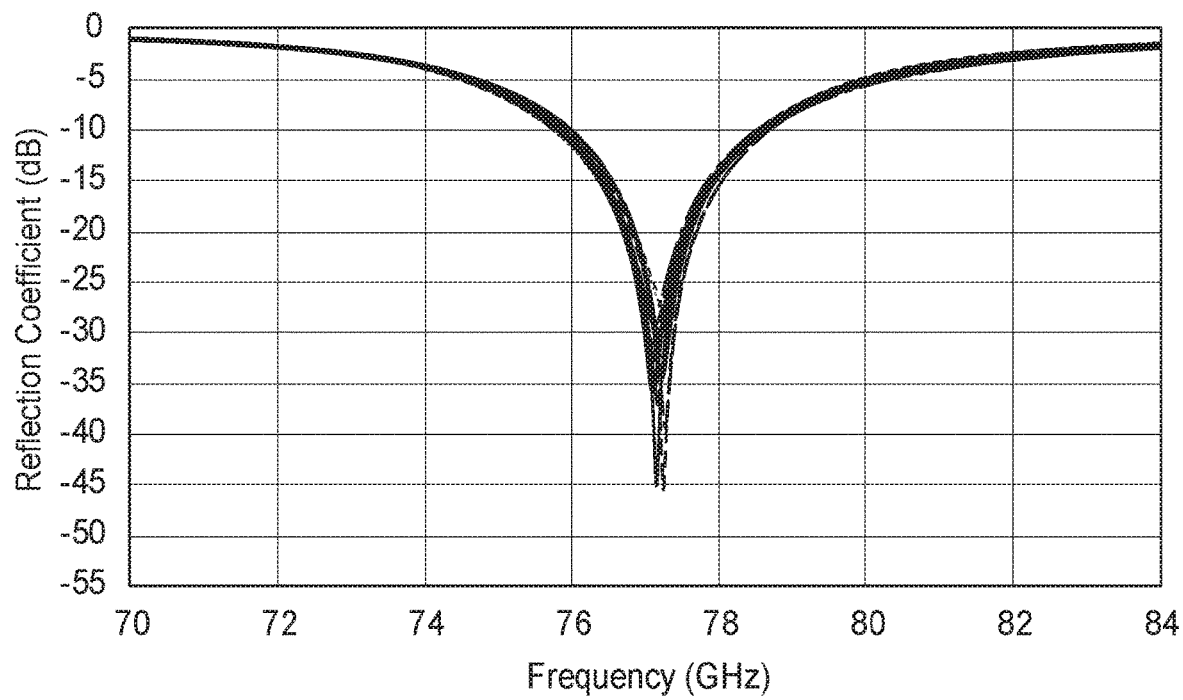
FIG. 6 shows modeling results of a stacked half-wavelength and quarter-wavelength film.
Figure 7:
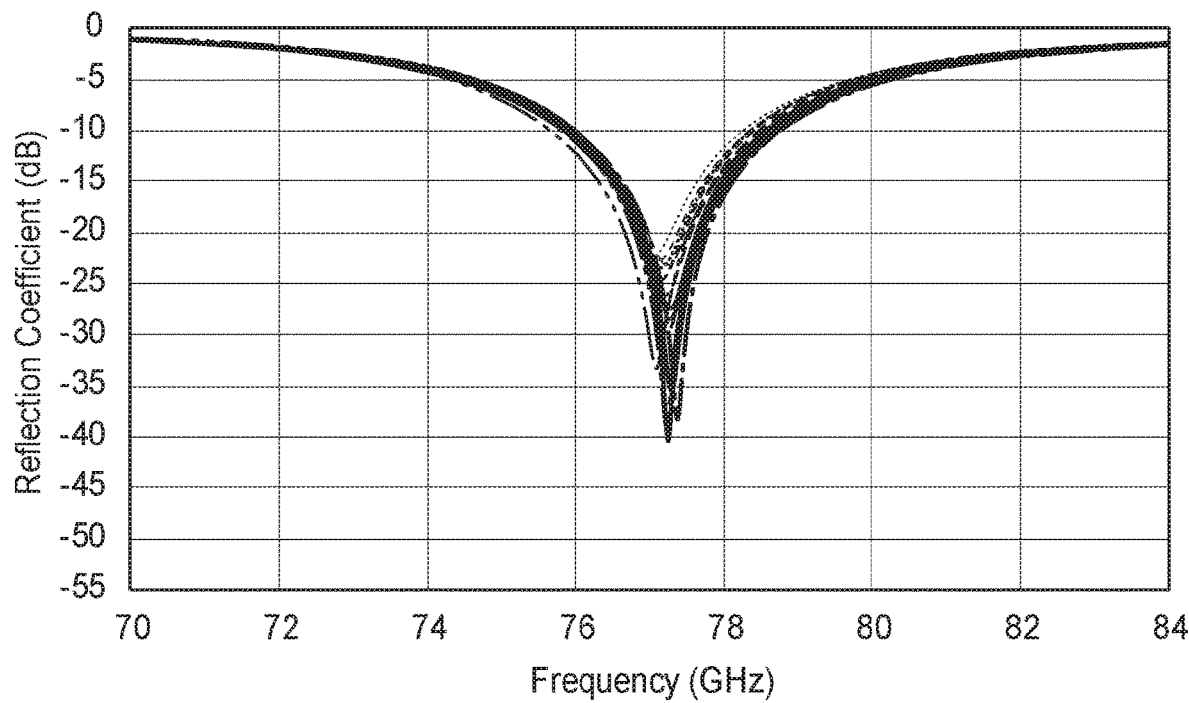
FIG. 7 shows modeling results of a two-layer stacked quarter-wavelength film.
Figure 8:
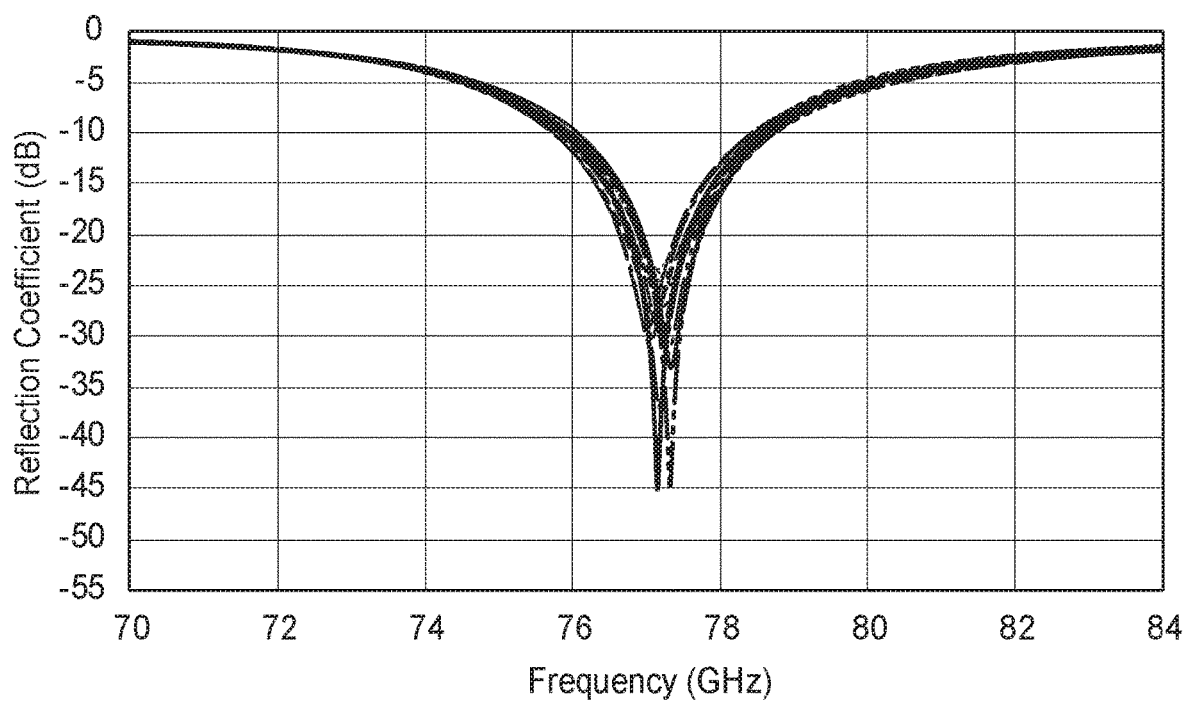
FIG. 8 shows modeling results of a stacked half-wavelength and quarter-wavelength film.

A range of thickness around the ideal case from equation 4 can have acceptable performance. In some cases, a range of up to 15% variation or 20% variation around the ideal thickness has shown performance benefit. FIG. 5 shows the reflection coefficient of a patch antenna when placed behind the bumper fascia with a two-layer stacked quarter-wavelength film, where the thickness of each layer varies between ±10%. The frequency shift varies within 250 MHz range (about 0.3% of the center frequency 77 GHz). This variation is even less significant for the case of a stacked half-wavelength and quarter-wavelength film shown in FIG. 6 where the frequency shift is less than 160 MHz (about 0.2% of the center frequency 77 GHz) for ±10% thickness variation. When the thickness variation expands over ±20% of the nominal thickness, a frequency shift of about 340 MHz, as shown in FIG. 7, and 320 MHz, as shown in FIG. 8, for the case of QW-QW and HW-QW is observed, respectively. FIGS. 5-8 were modeled using the radar reflection variability test method described in the Example section below.

Another embodiment includes an anti-reflection (AR) film comprised of one half-wavelength and a second quarter-wavelength layer where the permittivity of the half-wavelength layer, $\varepsilon_{1/2\,wave}$, is chosen to equal half of the bumper fascia permittivity as expressed in equation 6.

$$\varepsilon_{\frac{1}{2}wave} = \sqrt{\varepsilon_{air} \times \varepsilon_{center}} \quad \text{(eqn. 6)}$$

Where $\varepsilon_{center}$ is obtained from equation 1.

The quarter-wavelength layer, in this embodiment, has permittivity, $\varepsilon_{1/4\,wave}$, chosen to equal the geometric mean of the half-wavelength layer permittivity and the bumper fascia permittivity, as expressed in equation 7.

$$\varepsilon_{\frac{1}{4}wave} = \sqrt{\varepsilon_{\frac{1}{2}wave} \times \varepsilon_{bumper}} \quad \text{(eqn. 7)}$$

As in previous embodiment, the thicknesses for the quarter-wavelength layer depends on their permittivity by the relationship of equation 8. The preferred thickness for the half-wavelength layer is chosen according to equation 9.

$$\text{quarter-wavelength thickness} = \frac{c}{4f\sqrt{\varepsilon_{\frac{1}{4}wave}}} \quad \text{(eqn. 8)}$$

$$\text{half-wavelength thickness} = \frac{c}{2f\sqrt{\varepsilon_{\frac{1}{2}wave}}} \quad \text{(eqn. 9)}$$

For the case of common fascia thickness (2.0 to 3.0 mm), the optimum values of the permittivity/thickness for the half-wavelength and quarter-wavelength structure is given in Table 3.

TABLE 3

Optimized values at a target frequency of 77 GHz for the permittivity of a stacked half-wavelength and quarter-wavelength structure for various permittivity fascia.

| Fascia Permittivity | QW layer ε (thickness) | HW layer ε (thickness) |
|---|---|---|
| 2 | 4.54 (785 μm) | 1.19 (1785 μm) |
| 2.2 | 4.64 (761 μm) | 1.22 (1763 μm) |
| 2.4 | 1.73 (741 μm) | 1.24 (1749 μm) |
| 2.6 | 1.82 (722 μm) | 1.27 (1729 μm) |
| 2.8 | 1.90 (707 μm) | 1.29 (1715 μm) |
| 3 | 1.99 (690 μm) | 1.32 (1696 μm) |

Table 4 shows calculated optimum values when the lower limit of the permittivity is fixed to a value of 1.45. In this scenario, only the quarter-wavelength layer was allowed to vary to optimize the reflectance.

TABLE 4

Optimized values at a target frequency of 77 GHz for the permittivity of a stacked half-wavelength and quarter-wavelength structure for various permittivity fascia, with the restriction that the half-wavelength layer may not have permittivity below 1.45.

| Fascia Permittivity | QW layer ε (thickness) | HW layer ε (thickness) |
|---|---|---|
| 2 | 1.75 (736 μm) | 1.45 (1618 μm) |
| 2.2 | 1.79 (728 μm) | 1.45 (1618 μm) |
| 2.4 | 1.86 (714 μm) | 1.45 (1618 μm) |
| 2.6 | 1.93 (701 μm) | 1.45 (1618 μm) |
| 2.8 | 2.00 (689 μm) | 1.45 (1618 μm) |
| 3 | 2.09 (674 μm) | 1.45 (1618 μm) |

The idealized interference structures incorporating half-wavelength and quarter-wavelength layers do not take into account the near-field interactions between radar antennae and vehicle fascia with anti-reflection stack. Equations 2 thru 9 represent a far-field solution, and for this application, the distances dictate a near-field solution to provide the preferred solution. To arrive at final optimizations for permittivity and thickness for each layered structure for the near-field condition, electromagnetic simulation software from Computer Stimulation Technology (CST) was used with starting values derived from these idealized half-wavelength and quarter-wavelength structures. The deviation from the final optimized condition and that predicted by equations 2 thru 9 are due to the deviance between best final layer construction and those predicted by the first order interference models of equations 2 thru 9 is typically less than 15% for permittivity and thickness values. For example, half-wavelength permittivity as calculated by equation 6 for $\varepsilon_{bumper}=2.6$ would predict $\varepsilon_{1/2wave}=1.27$. In optimized case, the best results from CST simulation is achieved when $\varepsilon_{1/2wave}=1.3$. The difference in this case is about 2%. For another example, quarter-wavelength permittivity as calculated from equation 7 for $\varepsilon_{bumper}=2.6$ would predict $\varepsilon_{1/4wave}=1.82$. In optimized case, the best results from CST simulation is achieved when $\varepsilon_{1/4wave}=1.70$. This difference in this case is about 7%. In each instance, the near-field optimized solution for permittivity has been found to be within 15% of the value predicted by far-field solutions of equations 2 thru 9. Table 5 summarizes the near-field optimized results for various permittivity of fascia. In each instance the near-field solution is within 15% of the calculated results from Table 3.

TABLE 5

Near-field optimized results for permittivity/thickness for a stacked half-wavelength and quarter-wavelength structure at various fascia permittivity.

| Fascia Permittivity | QW layer ε (thickness) | HW layer ε (thickness) |
| --- | --- | --- |
| 2 | 1.5 (890 µm) | 1.1 (1890 µm) |
| 2.6 | 1.7 (850 µm) | 1.3 (1750 µm) |
| 3 | 1.8 (820 µm) | 1.4 (1670 µm) |

Figure 9:
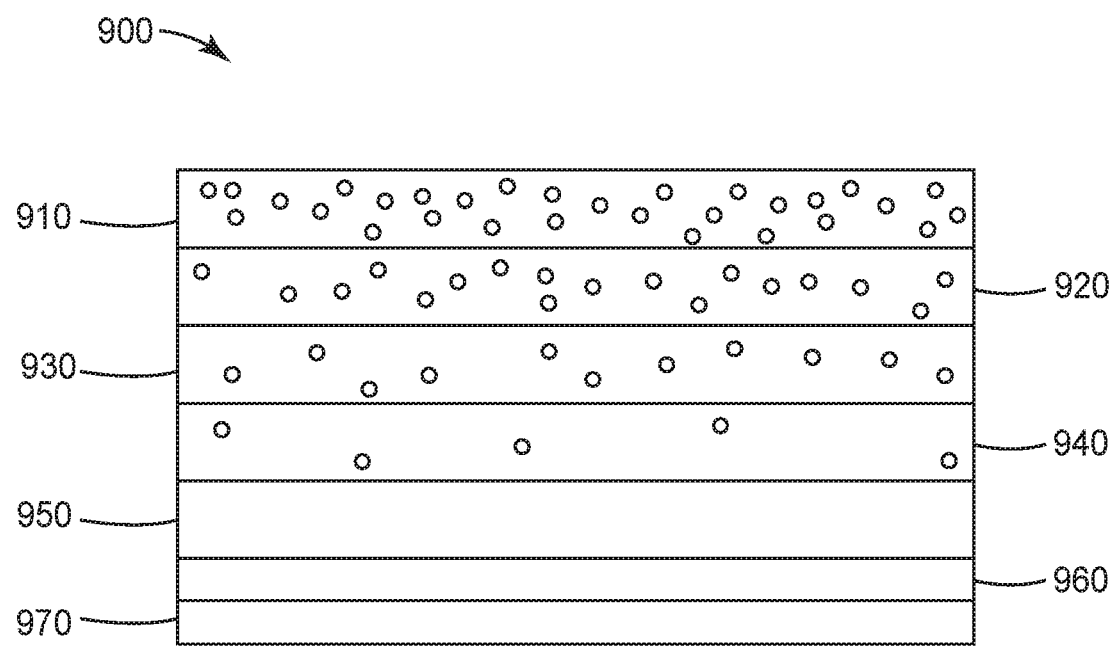
FIG. 9 is a side elevation cross section of a multilayer gradient permittivity tape.

FIG. 9 is a side elevation cross section of a multilayer gradient permittivity tape. Gradient permittivity tape 900 includes first layer 910, second layer 920, third layer 930, fourth layer 940, fifth layer 950, adhesive layer 960, and backing layer 970. Other embodiments may include additional layers. Gradient permittivity tape 900 in FIG. 9 illustrates a multilayer stack design where each of first layer 910, second layer 920, third layer 930, and fourth layer 940 have a different effective permittivity and represent a stepped change moving along the thickness direction of the gradient permittivity tape (up and down in the reference frame of FIG. 9). Each of the layers in FIG. 9 may be formed separately and attached, such as with an adhesive or through another process such as heat lamination, or they may be formed successively with varying process conditions or input material (for example, different resins with different loadings of glass or plastic microbubbles). FIG. 9 is a simplified illustration, and the boundaries between each of the layers is not necessarily as flat and defined in real-world manufactured articles. In some embodiments, the continuous matrix for each of the layers is the same material. In other embodiments, the continuous matrix and/or the secondary components for layers are different materials.

Gradient permittivity tape also includes adhesive layer 960 and backing layer 970. Adhesive layer 960 may include any suitable adhesives, including pressure sensitive adhesives, repositionable adhesives, or stretch releasable adhesives. Adhesive layer 960 may be any suitable thickness to provide secure contact to a surface with which it is attached. Adhesive layer 960 may alternatively include curable components, such as UV-curable components or heat curable components. In some embodiments, adhesive layer 960 may also include one or more of the components including the inert gas or air, such as glass or plastic microbubbles, cenospheres, ceramic particles, or free voids, in order to further control the permittivity gradient.

Backing layer 970 may include any suitable film or layer to protect the adhesive properties of adhesive layer 960 and also prevent accidental adhesion of gradient permittivity tape 900 to undesired surfaces. Suitable materials for backing layer 970 include plastic films, coated or uncoated paper, or the like. Backing layer 970 may be selected so that it itself does not have strong adhesion to adhesive layer 960, and therefore is easily removable by hand or with limited tools.

Figure 10:
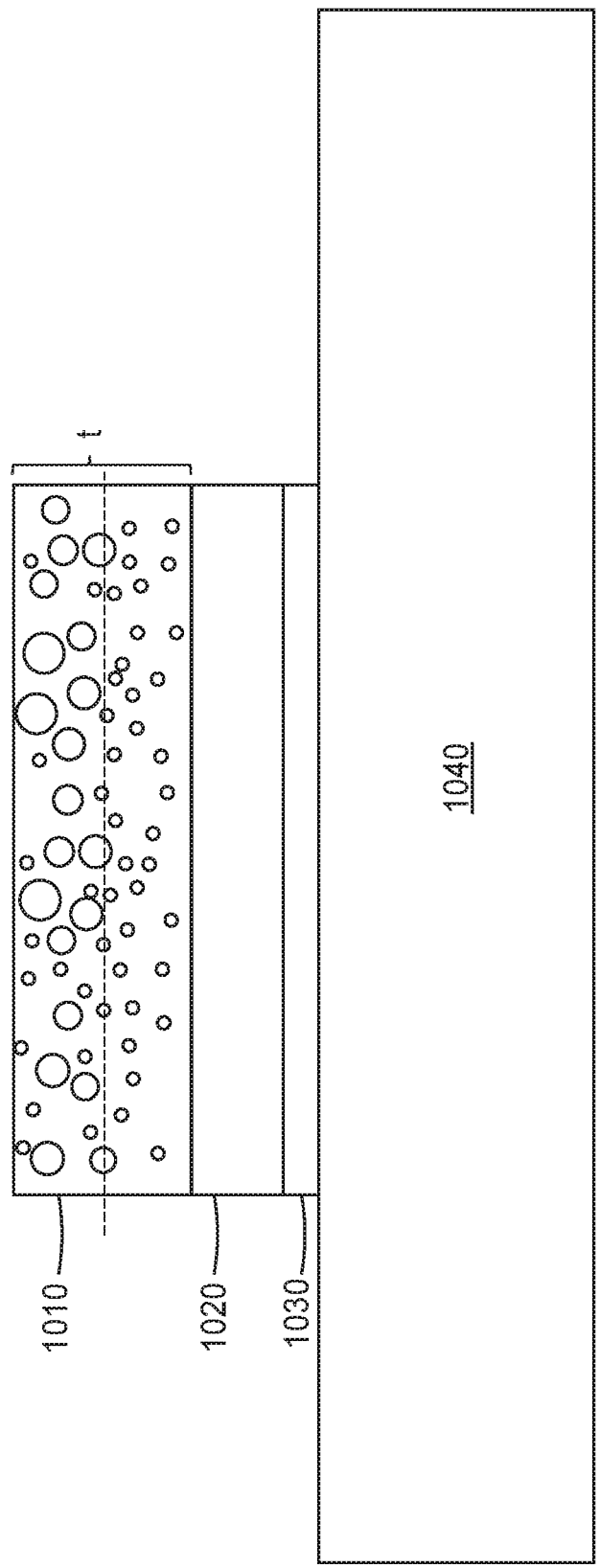
FIG. 10 is a side elevation cross section of a single layer gradient permittivity film attached to a surface.

FIG. 10 is a side elevation cross section of a single layer gradient permittivity film attached to a surface. The gradient permittivity tape includes single layer gradient permittivity film 1010 disposed on substrate 1020 and attached to surface 1040 via adhesive layer 1030. Gradient permittivity 1010 in FIG. 10 is a single layer gradient permittivity film. In some embodiments, a single layer gradient permittivity film may be formed through disposing differently-sized or shaped microbubbles (in glass or plastic), expandable microspheres, cenospheres, air or other inert gas bubbles or a combination thereof in an uncured flowable material. Such a flowable material may be disposed or coated onto substrate 1020, through any suitable method such as dip coating, spin coating, spray or conformal coating, or even printing. When the particles or bubbles are allowed to flow within the material, on average those having a larger air or gas volume fraction will rise to the top of the material, while those with a smaller air or gas volume fraction will remain where they were or will sink toward the bottom. Accordingly, it is possible to create a gradient permittivity along the thickness, within a single layer. As in gradient permittivity film 100 in FIG. 1, the difference in the permittivity between the top and bottom halves of gradient permittivity film 1010 may be at least 10%.

The gradient permittivity film of FIG. 10 is attached to surface 1040 via adhesive layer 1030. In some embodiments, gradient permittivity film 1010 may have been configured as a tape, with the adhesive layer disposed on the gradient permittivity film prior to attachment to surface 1040, as described and shown in FIG. 9. In some embodiments, gradient permittivity film 1010 is attached to surface 1040 by application of adhesive layer 1030 at or near the time of attachment. Any suitable adhesive may be used.

Surface 1040 may be, in some embodiments, a vehicle fascia. Surface 1040 may be a radome. In some embodiments, surface 1040 may be a different protective cover or casing, such as an antenna covering or the external surface of an electronic device. In some embodiments, although FIG. 10 illustrates one gradient permittivity film attached to the surface, more than one gradient permittivity tape may be attached to the surface in the same or similar manner. In some embodiments, a second gradient permittivity film is attached to the opposite side of surface 1040, with its half having lower relative permittivity being disposed away from surface 1040. Surface 1040 may be curved or nonplanar, and gradient permittivity film or a tape including such a film may be similarly formed, flexible, or compliant in order to adhere closely to the shape of surface 1040.

In some embodiments, at a location of attachment of the gradient permittivity film to the surface, a relative permittivity of the surface is within 10% of the relative permittivity of the continuous matrix. In particular, if different layers within the gradient permittivity film have different continuous matrix materials, then the continuous matrix nearest to the surface is the one to be within 10% of the relative permittivity of the surface. In some embodiments, the relative permittivity of the surface may be within 5% of the relative permittivity of the continuous matrix.

Gradient permittivity films described herein may be post-processed in order to further tune the properties and performance of these films. For example, gradient permittivity films described here in may be heated or thinned in order to selectively change the properties at a certain point or points on the film. In some embodiments, gradient permittivity films described herein may be perforated to selectively alter the permittivity characteristics at certain points at the film. In some embodiments these perforations have regular shapes and/or sizes. In some embodiments, these perforations are differently sized or shaped. In some embodiments, these perforations are round. In some embodiments, the perforations vary in size, shape, or density over one or more non-thickness directions.

The gradient permittivity film of the present invention can be used to antireflect intervening materials that are between the antenna and air. These intervening materials can be fascia (such as bumpers, body panels, grills, emblems, etc.). Auto fascia are often comprised of polymers such as polypropylene, polycarbonate or other engineering thermoplastics. In addition to needing to antireflect fascia, the radar unit itself has a cover piece referred to as the "radome" which also can create unwanted reflections. The gradient permittivity film of the present invention can be incorporated on the interior surface of the radome to minimize these reflections.

Radar transparent emblems such as those made from multilayer optical film or other technologies such as indium can be further enhanced in their transmission by use of the present invention.

Application of the gradient permittivity film to the intervening material can be done in numerous ways. The film can be post applied to fascia without thinning. Alternatively, the film can be formed into a 2- or 3-dimensional shape to conform to the surface of the mating fascia. There are several ways this can be done. For example, can be applied as an adhesive tape. Another way is to form a part of the film by methods such as pressure or thermoforming and then adhering it to the matching fascia part. Also, insert injection molding can be done, where the film is inserted into an injection mold and then the fascia part is injection molded onto the film.

Another potential placement of radar unit is behind automotive glass, and in particular in the rear-view mirror module facing forward toward the windshield. In this mode, the permittivity film can be tuned to antireflect the automotive window construction. Auto window constructions can include glass/polyvinylbutyral/glass laminates.

EXAMPLES

Physical Example Description

A sample of 4-layer structures were coated to facilitate the radar transmission measurements; for testing configurations this samples was either fastened to either bare or painted 1.7 mm polypropylene plates to simulate automotive bumper material. The air volume for each layer of the three examples of 4-layer structure is provided in the form of hollow glass beads (3M Glass Bubbles K1) embedded in a matrix of 55% silicone acrylate (Sartomer CN990) and 45% tetra hydrofurfuryl acrylate (Sartomer SR285). In each example, each layer of the construction was 250 μm, for a total thickness of 1 mm.

The three examples differ from each other in that the density of glass beads, by % volume, is different for each of the 4 layers in the structure. For relative measurements, comparative example 1 (CE-1) is provided as a bare 1.7 mm polypropylene plate (no film) and comparative example 2 is provided as same 1.7 mm polypropylene plate with metallic gray paint layer of sufficient thickness so as to be visually opaque. The metallic gray paint mixture is 25% DBC9700 (black) commercially available from PPG and 25% Nissan silver (KYO Nissan equivalent available from Dupont P2929) and 50% DT885 reducer/solvent also from PPG.

TABLE 6

Example description

| | Density of Glass Beads, % volume | | |
|---|---|---|---|
| Layer # | Example 1 | Example 2 | Example 3 |
| 1 | 22% | 22% | 22% |
| 2 | 33% | 33% | 33% |

TABLE 6-continued

Example description

| | Density of Glass Beads, % volume | | |
|---|---|---|---|
| Layer # | Example 1 | Example 2 | Example 3 |
| 3 | 55% | 55% | 55% |
| 4 | 70% | 75% | 60% |

The percent bead density by volume for each layer, as shown in the table above, is expected to directly influence the permittivity of the layer. The expected permittivity as a function of glass bead vol % is shown in Table 7.

TABLE 7

Calculated relative permittivity expected for differing glass bead vol % in layer

| Vol % | Permittivity |
|---|---|
| 22% | 2.40 |
| 23% | 2.38 |
| 24% | 2.36 |
| 25% | 2.34 |
| 26% | 2.32 |
| 27% | 2.31 |
| 28% | 2.29 |
| 29% | 2.27 |
| 30% | 2.25 |
| 31% | 2.23 |
| 32% | 2.21 |
| 33% | 2.19 |
| 34% | 2.17 |
| 35% | 2.15 |
| 36% | 2.13 |
| 37% | 2.11 |
| 38% | 2.09 |
| 39% | 2.08 |
| 40% | 2.06 |
| 41% | 2.04 |
| 42% | 2.02 |
| 43% | 2.00 |
| 44% | 1.98 |
| 45% | 1.97 |
| 46% | 1.95 |
| 47% | 1.93 |
| 48% | 1.91 |
| 49% | 1.89 |
| 50% | 1.88 |
| 51% | 1.86 |
| 52% | 1.84 |
| 53% | 1.83 |
| 54% | 1.81 |
| 55% | 1.79 |
| 56% | 1.77 |
| 57% | 1.76 |
| 58% | 1.74 |
| 59% | 1.72 |
| 60% | 1.71 |
| 61% | 1.69 |
| 62% | 1.67 |
| 63% | 1.66 |
| 64% | 1.64 |
| 65% | 1.63 |
| 66% | 1.61 |
| 67% | 1.60 |
| 68% | 1.58 |
| 69% | 1.56 |
| 70% | 1.55 |
| 71% | 1.53 |
| 72% | 1.52 |
| 73% | 1.50 |
| 74% | 1.49 |
| 75% | 1.47 |
| 76% | 1.46 |
| 77% | 1.45 |

TABLE 7-continued

Calculated relative permittivity expected
for differing glass bead vol % in layer

| Vol % | Permittivity |
|---|---|
| 78% | 1.43 |
| 79% | 1.42 |
| 80% | 1.40 |

Modeled Example Description

Modeled examples were constructed to test system susceptibility to variation of systems elements such as bumper fascia thickness and air gap between radar unit and bumper fascia/AR film stack. The commercial tool used for these calculations is the electromagnetic simulation software from Computer Stimulation Technology (CST). Modeling was conducted in two manners, one using a patch antenna as a source, the second with a plane wave source. Example 4 is composed of a half-wavelength single layer slab between bumper fascia and antennae where permittivity of the slab is 1.3 and its thickness is 1.75 mm. Example 5 is a half-wavelength, quarter-wavelength bilayer where the permittivity of the quarter-wavelength layer is 1.7 and the thickness is 0.85 mm and the half-wavelength slab matches example 4. Example 6, 7, and 8 are tri-layer structures with permittivity and thicknesses presented in Table 8. Example 9 is a bilayer structure with each layer being targeted to quarter-wavelength-quarter-wavelength structure described previously. Example 10 is modelled to demonstrate slightly "off optimal" conditions when compared to example 9.

TABLE 8

| Example | Layer 1 Perm. ε | Layer 1 thickness [mm] | Layer 2 Perm. ε | Layer 2 thickness [mm] | Layer 3 Perm. ε | Layer 3 thickness [mm] | Total thickness [mm] |
|---|---|---|---|---|---|---|---|
| Ex 4 | 1.30 | 1.75 HW | | | | | 1.75 |
| Ex 5 | 1.70 | 0.85 QW | 1.30 | 1.75 HW | | | 2.60 |
| Ex 6 | 1.30 | 0.85 QW | 1.69 | 1.50 HW | 2.20 | 0.657 QW | 3.007 |
| Ex 7 | 1.30 | 0.85 QW | 1.69 | .050 | 2.20 | 0.657 QW | 1.557 |
| Ex 8 | 1.30 | 0.281 | 1.69 | 0.503 | 2.20 | 0.216 | 1.0 |
| Ex 9 | 1.29 | 0.856 | 2.16 | 0.681 | | | 1.537 |
| Ex 10 | 1.47 | 0.866 | 2.34 | 0.610 | | | 1.476 |

TABLE 9 variation conditions for bumper fascia thickness
and distance between antenna and bumper

| | 1 | 2 | 3 | 4 | 5 | 6 | 7 | 8 | 9 | 0 | 11 | 12 |
|---|---|---|---|---|---|---|---|---|---|---|---|---|
| Bumper thickness (mm) | 2.8 | 3 | 3.2 | 2.8 | 3 | 3.2 | 2.8 | 3 | 3.2 | 2.8 | 3 | 3.2 |
| Air gap (mm) | 0.4 | 0.4 | 0.4 | 0.8 | 0.8 | 0.8 | 1.2 | 1.2 | 1.2 | 1.6 | 1.6 | 1.6 |

Figure 17:
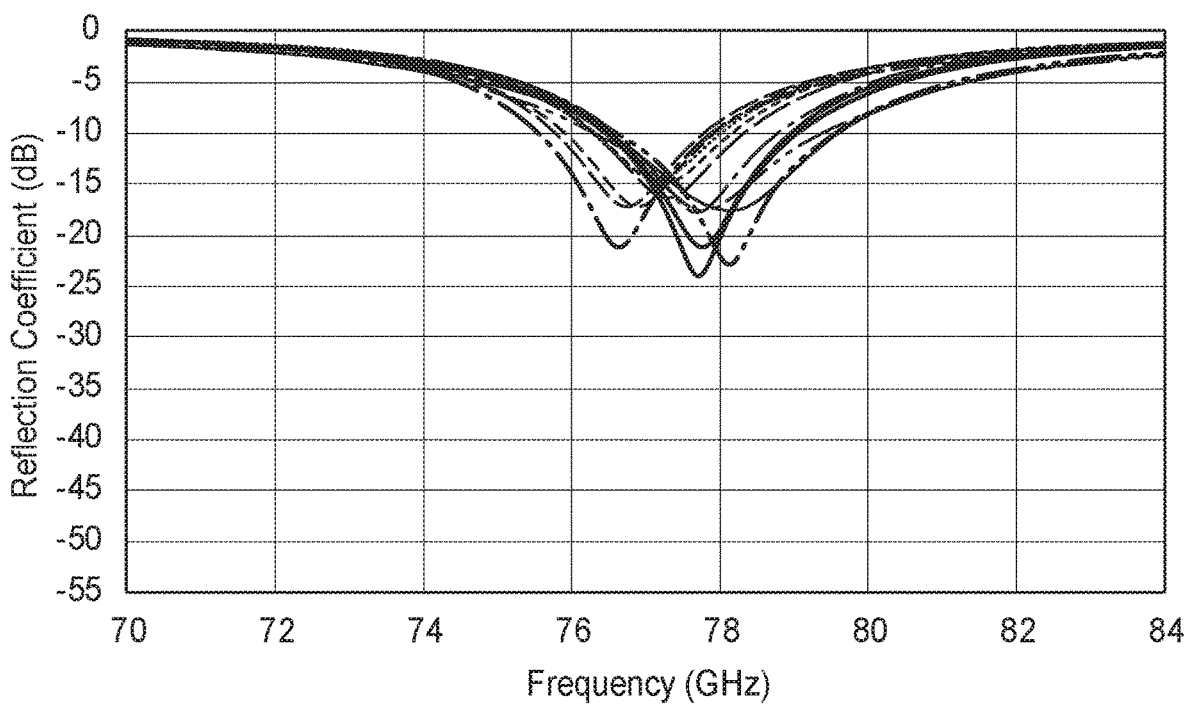
FIG. 17 shows the ensemble reflection coefficient of an antenna.

For each variation condition the reflection coefficient spectrum for 70 to 84 GHz was calculated and plotted. FIG. 17 shows the ensemble reflection coefficient spectrum for the antennae bumper fascia without any AR layer for all (12) variation conditions of table 9. From this baseline, we see that these systematic variation results in a 1.51 GHz frequency shift (about 2% of the resonant frequency) in the absence of any anti-reflection layer structures. This frequency shift for given range of variations was used as the metric for the reflection variability test.

In vicinity of bumper fascia, the near field profile of the electric field radiated by the radar antenna will change according to dielectric properties of the bumper fascia. This means the bumper fascia has a loading effect on each element of the antenna array and detunes the frequency of which the antenna array is designed to operate. Therefore, anti-reflection film should be able to mitigate the impact and prevent the loading effect which causes the frequency shift observed.

Test Methods
Radar Reflection Variability Test Method (Modeling)

Figure 16:
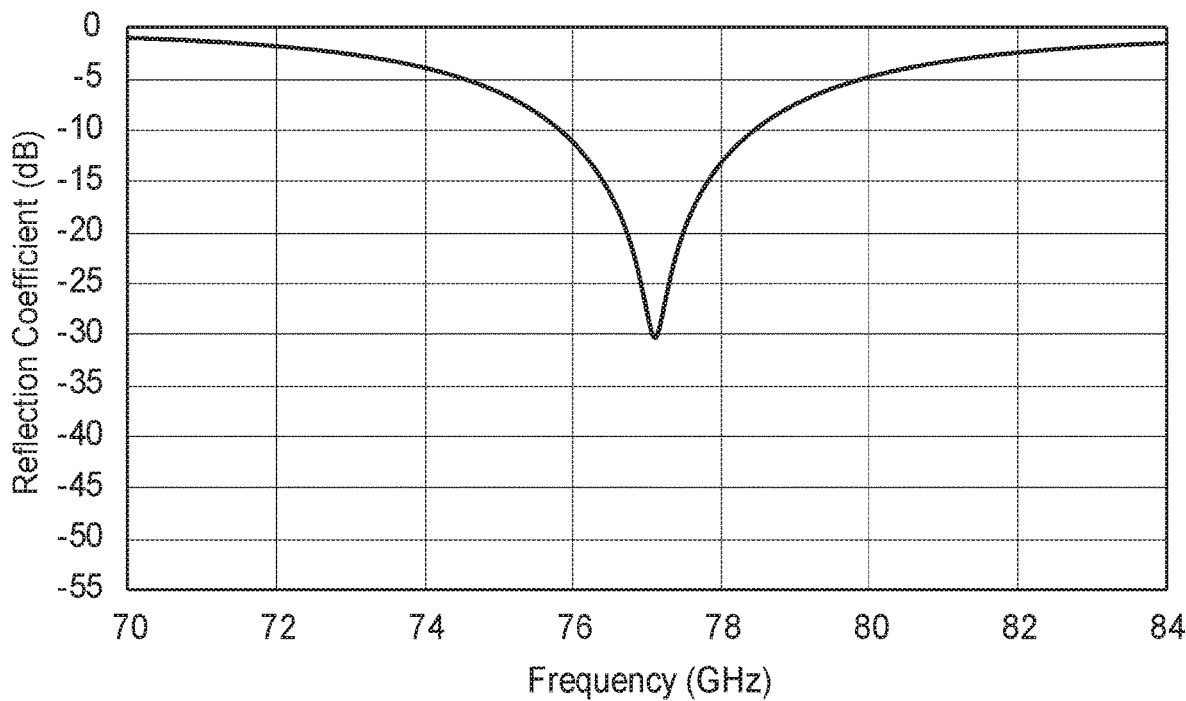
FIG. 16 shows the reflection coefficient of an antenna.

For the patch antenna models, the representative system with a radar source/antennae plane positioned at a prescribed air gap distance behind a bumper fascia layer represents the ideal configuration. For this configuration, the permittivity of the bumper fascia was set to 2.6. The goal of the modeling examples 5-9 was to compare the overall system robustness to variations on these two parameters for different anti-reflection layer constructions. To make this comparison, a baseline reflection coefficient spectrum was first designed to radiate at 77 GHz. FIG. 16 shows the reflection coefficient of the antennae in free space from 70 to 84 GHz. The simulations used for the reflection variability test method varied the bumper fascia thickness from 2.8 to 3.2 mm thickness and the bumper fascia-to-antennae air gap from 0.4 to 1.2 mm stepwise over (12) conditions shown in Table 9.

Radar Attenuation Test Method (Experimental)

For the experimental results of the physical samples, the test set up included three essential pieces: (A) a radar testing unit, (B) the sample, positioned about 20 mm from this radar unit and (C) a detection target.

The radar testing unit was a commercially available INRAS RadarBook with MIMO 77 GHz front-end. The unit provides a measure, Rx signal [dBV], which is a measure of the relative measurement of the detected radar signal reflected by the sample and detection target combined. The output from the testing unit provides a signature of measured signal versus distance from the test head. This is reported simply as "radar signal plot" in measurement results section in form of figures showing graph of Rx versus distance from radar testing unit.

The sample's proximity to the radar unit and attachment of the multi-layers to the 1.7 mm thick polypropylene plate was designed to simulate the effect of a bumper/fascia on the radar signal. Although the distance from the radar unit to the plate was nominally 20 mm, this was adjusted slightly between measurements to obtain case for both maximum and minimum target signal. Typical slight adjustments were less than about 2 mm from 20 mm nominal distance. This adjustment was expected to demonstrate the variability for the measurements due to subtle positioning of samples relative to radar source. In an ideal case, the difference in target signal between the minimum and maximum would be minimized. In the examples shown, a reduction in this variation is seen of around 5 dB compared to the variation seen in the bare plate alone. As the samples become less visible to the radar source, less variability with sample adjustment is observed.

For the detection target, a copper plate was placed at approximately 3.5 m from the radar unit. This target distance shows up as peak in the radar unit output of Rx versus distance.

Measurement Results

Figure 11:
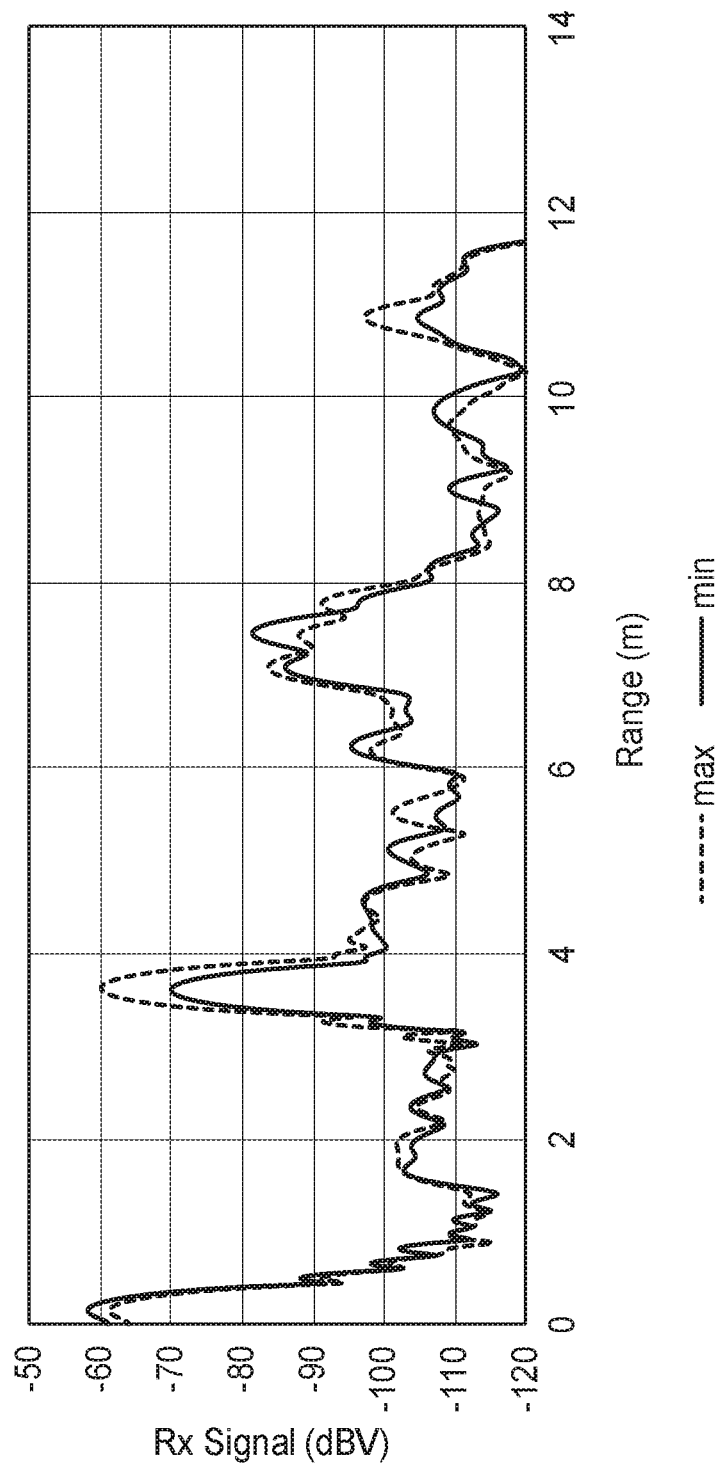
FIG. 11 is a graph of radar signal plots from Comparative Example 1.
Figure 12:
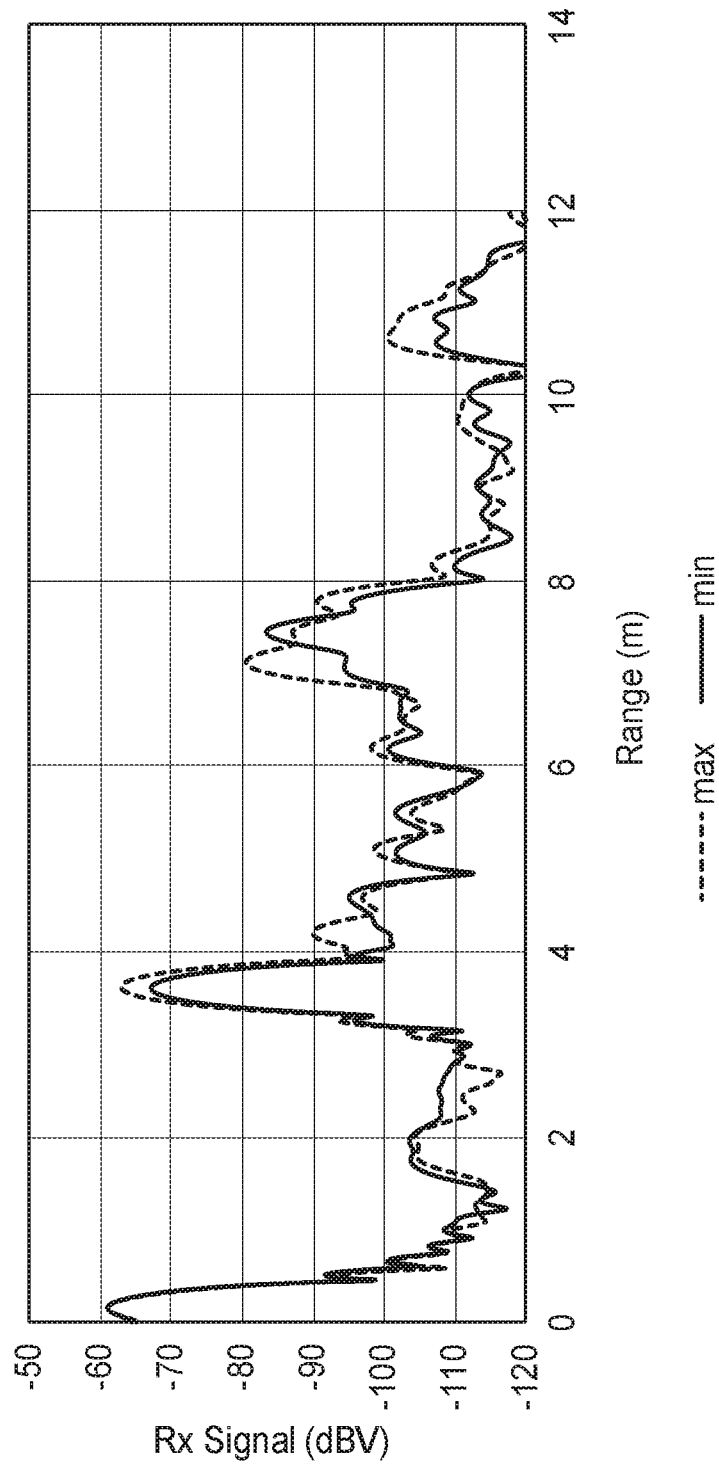
FIG. 12 is a graph of radar signal plots from Example 1.
Figure 13:
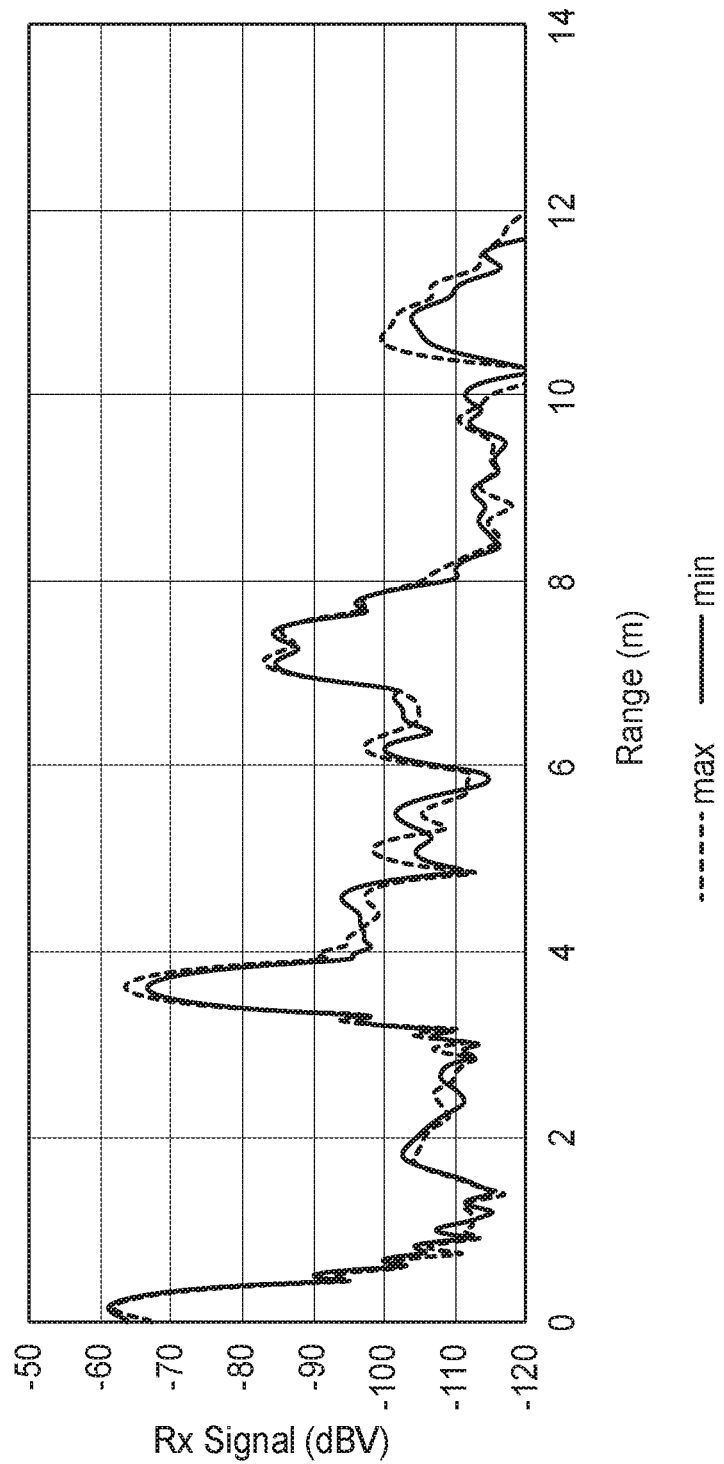
FIG. 13 is a graph of radar signal plots from Example 2.
Figure 14:
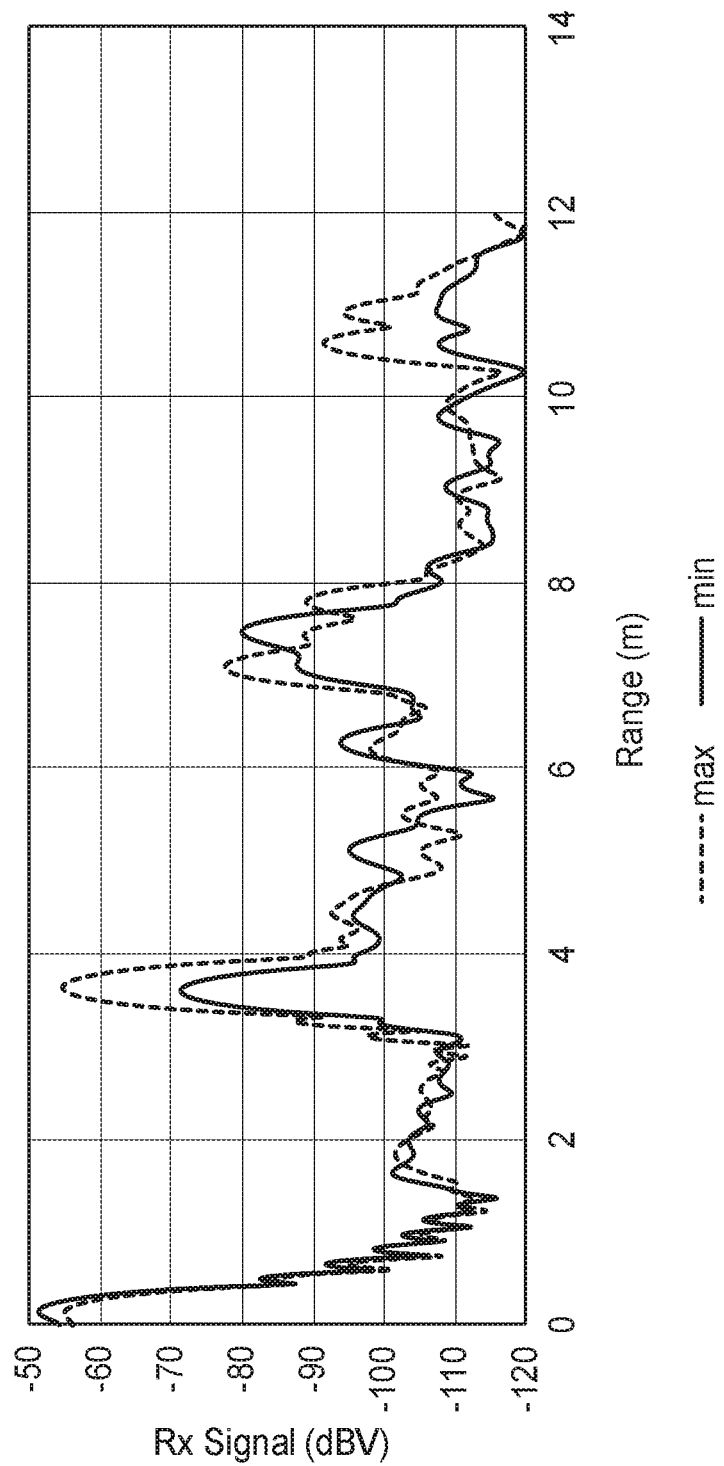
FIG. 14 is a graph of radar signal plots from Example 3.
Figure 15:
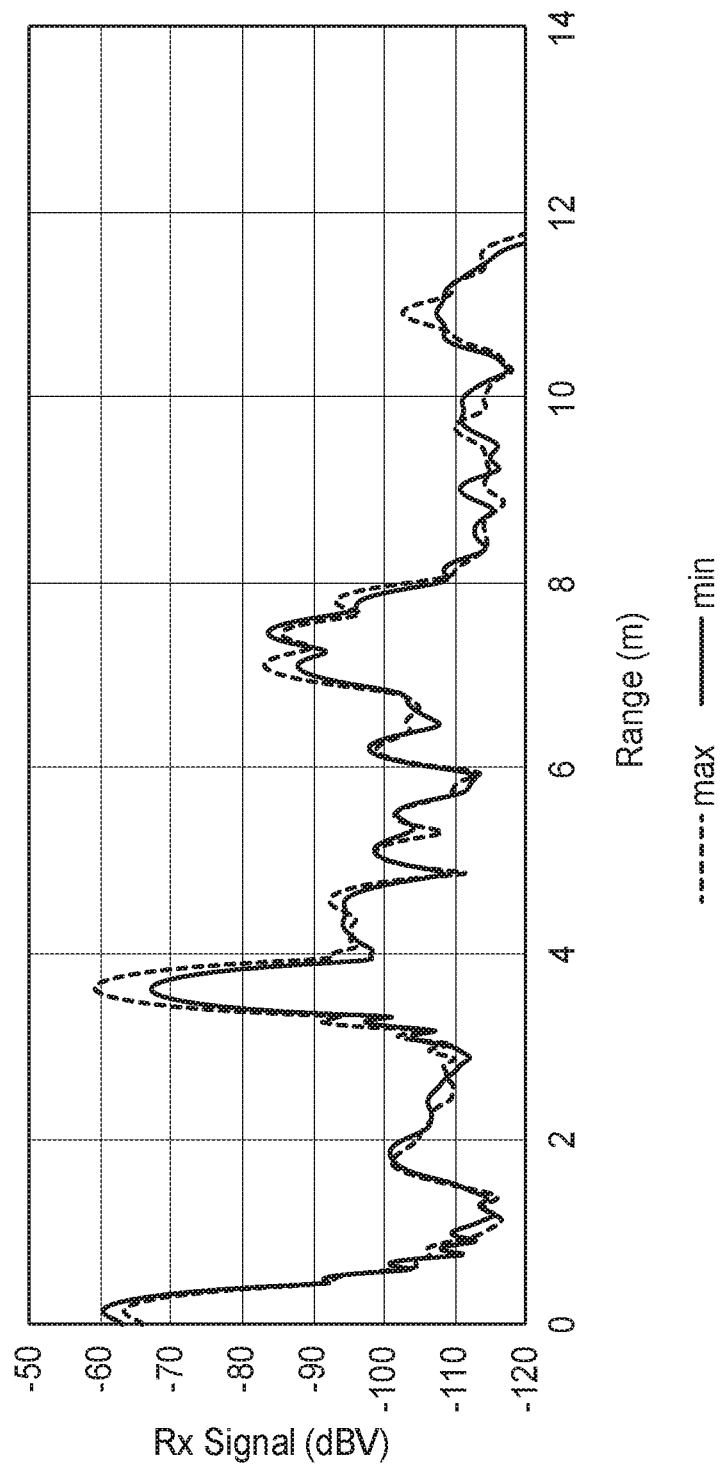
FIG. 15 is a graph of radar signal plots from Comparative Example 2.
Figure 18:
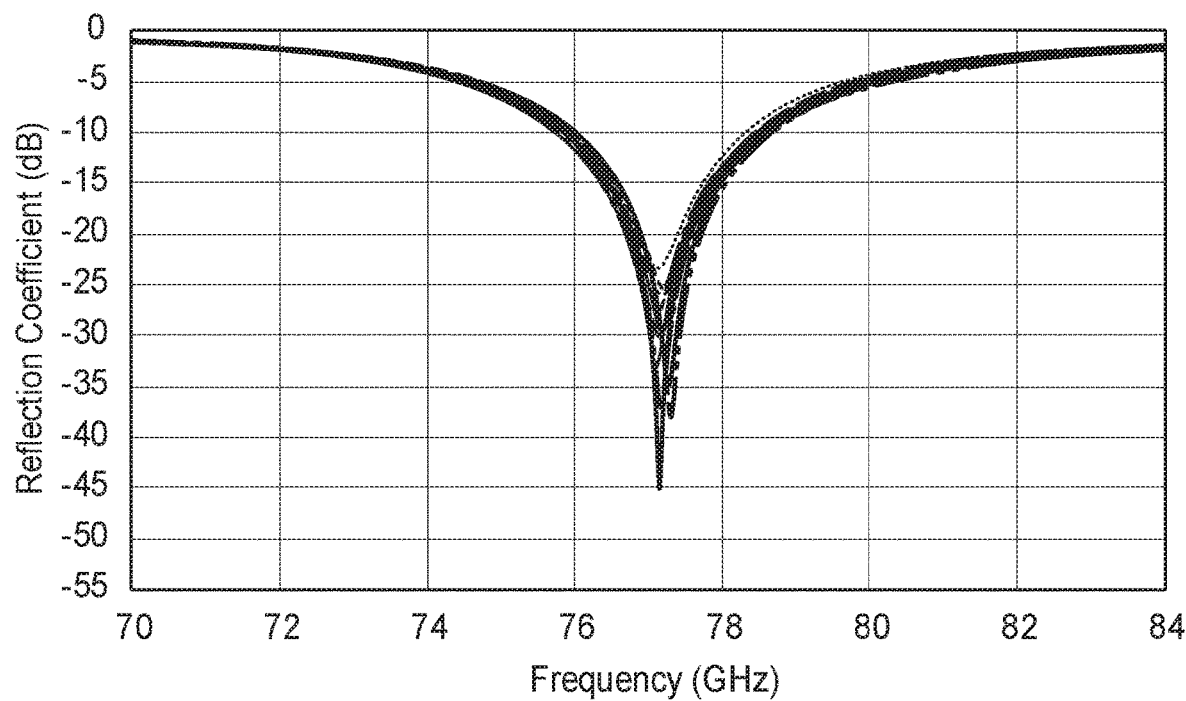
FIG. 18 shows modeling results from Example 5.
Figure 19:
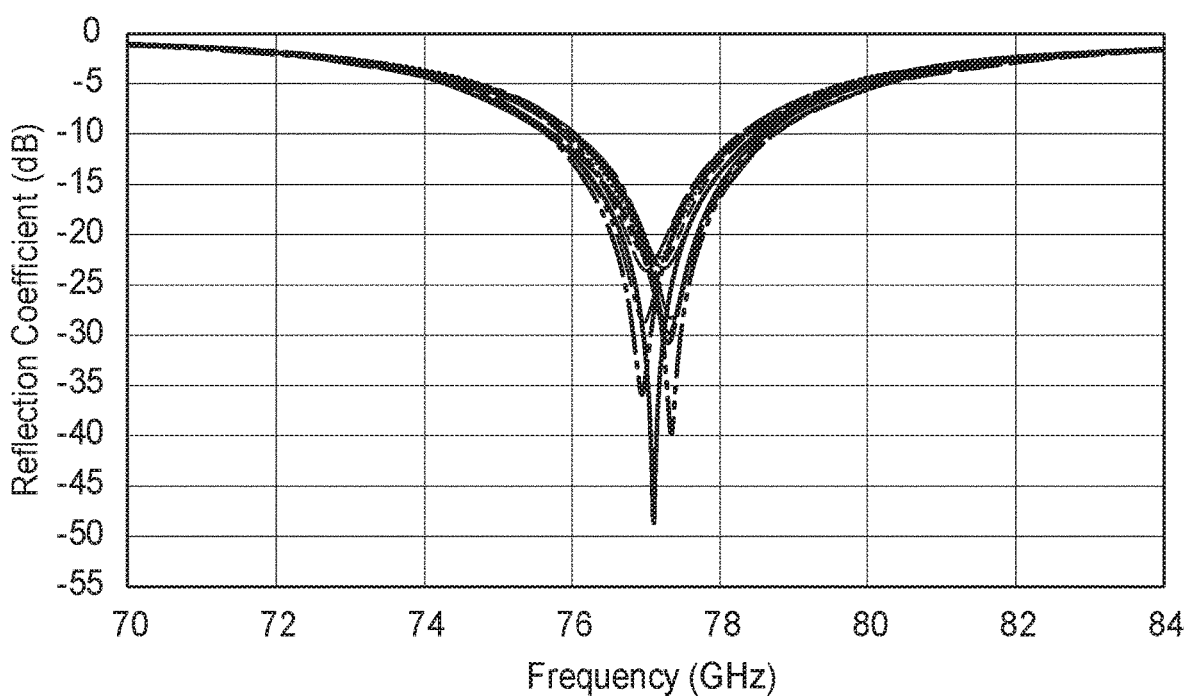
FIG. 19 shows modeling results from Example 9.

For some measurements, the sample was attached to a bare polypropylene plate (1 through 3) and for others, the sample was attached to a polypropylene plate that was painted gray (with metallic flakes) in order to increase the reflection from the plate. FIG. 11 shows the radar signal plots from Comparative Example 1 (baseline bare polypropylene plate). FIG. 12 shows the radar signal plots from Example 1 on bare polypropylene plate. FIG. 13 shows the radar signal plots from Example 2 on bare polypropylene plate. FIG. 14 shows the radar signal plots from Example 3 on painted polypropylene plate (corresponding to comparative Example 2). FIG. 15 shows the radar signal plots from Comparative Example 2 (polypropylene plate painted with grey paint including metallic flakes). The radar reflection variability modeling results are shown in Table 10. The radar reflection variability modeling results for Examples 5 and 10 are shown in FIGS. 18 and 19.

TABLE 10

| Example | Freq variation [GHz] | Freq variation [%] | Total AR thickness |
|---|---|---|---|
| Bumper fascia only (baseline) | 1.51 | 1.97 | n.a. |
| Ex 4 single layer HW | 0.80 | 1.03 | 1.75 |
| Ex 5 bilayer HW QW | 0.23 | 0.29 | 2.60 |
| Ex 6 trilayer QW HW QW | 0.3 | 0.39 | 3.007 |
| Ex 7 trilayer QW thin QW | 0.36 | 0.47 | 1.557 |
| Ex 8 trilayer | 0.28 | 0.36 | 1.0 |
| Ex. 9 QW QW | 0.40 | 0.52 | 1.537 |
| Ex. 10 QW QW "off optimal" | 0.52 | 0.70 | 1.476 |

Descriptions for elements in figures should be understood to apply equally to corresponding elements in other figures, unless indicated otherwise. The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

What is claimed is:

1. A gradient permittivity film comprising:
   a first permittivity layer comprising a first continuous matrix of a first material having a first relative permittivity ($\varepsilon_{r1}$) and a second component having a second relative permittivity ($\varepsilon_{r2}$) dispersed in the first continuous matrix, the first permittivity layer having a first effective layer relative permittivity ($\varepsilon_1$) and a thickness ($T_1$); and
   a second permittivity layer having a second effective layer relative permittivity ($\varepsilon_2$) and a thickness ($T_2$) disposed on the first permittivity layer;
   wherein the gradient permittivity film has a haze greater than 50% or a transmission of visible light less than 50%; and
   wherein:
   $\varepsilon_1$ is greater than $\varepsilon_2$ by at least 10% for at least one frequency (f) within a frequency range between 20 GHz and 300 GHz, $\varepsilon_1 = 1.1$ to $10$ $\varepsilon_2 = 1.11$ to $10$ $T_1 = 0.8(t_1)$ to $1.2(t_1)$, where $t_1 = \dfrac{c}{4f\sqrt{\varepsilon_1}}$ $T_2 = 0.8(t_2)$ to $1.2(t_2)$, where $t_2 = \dfrac{c}{4f\sqrt{\varepsilon_2}}$ $\varepsilon_{r1}$ is greater than $\varepsilon_{r2}$ for the frequency $f$.

2. The gradient permittivity film of claim 1 wherein the second permittivity layer is an adhesive.

3. The gradient permittivity film of claim 2 wherein the second permittivity layer is an acrylic foam adhesive.

4. The gradient permittivity film of claim 1 wherein the second permittivity layer comprises a second continuous matrix of a fourth material having a fourth relative permittivity ($\varepsilon_{r4}$) and a fifth component having a fifth relative permittivity ($\varepsilon_{r5}$) dispersed in the second continuous matrix.

5. The gradient permittivity film of claim 1 wherein $\varepsilon_1$ is from 1.3 to 1.6.

6. The gradient permittivity film of any claim 1 wherein $\varepsilon_2$ is from 1.9 to 2.6.

7. The gradient permittivity film of any of claim 1 wherein f is within a frequency range between 20 GHz and 120 GHz.

8. The gradient permittivity film of claim 7 wherein f is within a frequency range between 20 GHz and 100 GHz.

9. The gradient permittivity film of claim 8 wherein f is within a frequency range between 20 GHz and 81 GHz.

10. The gradient permittivity film of claim 9 wherein f is within a frequency range between 76 GHz and 81 GHz.

11. The gradient permittivity film of claim 9 wherein f is within a frequency range between 20 GHz and 30 GHz.

12. The gradient permittivity film of any of claim 1 wherein $T_1$ is from 700 μm to 1200 μm and $T_2$ is from 400 μm to 900 μm.

13. The gradient permittivity film of claim 12 wherein $T_1$ is from 800 μm to 900 μm and $T_2$ is from 600 μm to 800 μm.

14. The gradient permittivity film of claim 1 wherein the second component is disposed within a third component having a third relative permittivity ($\varepsilon_{r3}$) and $\varepsilon_{r2} \leq \varepsilon_{r3}$ for the frequency f.

15. The gradient permittivity film of claim 14 wherein the third component is glass and the second component is air.

16. The gradient permittivity film of claim 1 wherein the first component includes a polymeric material.

17. The gradient permittivity film of claim 1 wherein the first continuous matrix is a nonwoven material.

18. The gradient permittivity film of claim 1 wherein the second component is air.

19. The gradient permittivity film of claim 1 wherein the first permittivity layer is laminated to the second permittivity layer.

20. The gradient permittivity film of claim 1 further comprising a backing layer disposed on the second permittivity layer opposing the first permittivity layer.

21. A gradient permittivity film comprising:
a first permittivity layer comprising a first continuous matrix of a first material having a first relative permittivity ($\varepsilon_{r1}$) and a second component having a second relative permittivity ($\varepsilon_{r2}$) dispersed in the first continuous matrix, the first permittivity layer having a first effective layer relative permittivity ($\varepsilon_1$) and a thickness ($T_1$); and
a second permittivity layer having a second effective layer relative permittivity ($\varepsilon_2$) and a thickness ($T_2$) disposed on the first permittivity layer;
wherein the gradient permittivity film has a haze greater than 50% or a transmission of visible light less than 50%; and
wherein:
$\varepsilon_1$ is greater than $\varepsilon_2$ by at least 10% for at least one frequency (f) within a frequency range between 20 GHz and 300 GHz, $\varepsilon_1 = 1.1$ to 10

$\varepsilon_1 = 1.11$ to 10

$T_1 = 0.8(t_1)$ to $1.2(t_1)$, where $$t_1 = \frac{c}{2f\sqrt{\varepsilon_1}}$$

$T_2 = 0.8(t_2)$ to $1.2(t_2)$, where $$t_2 = \frac{c}{4f\sqrt{\varepsilon_2}}$$

$\varepsilon_{r1}$ is greater than $\varepsilon_{r2}$ for the frequency f.

22. The gradient permittivity film of claim 21 wherein the second permittivity layer is an adhesive.

23. The gradient permittivity film of claim 22 wherein the second permittivity layer is an acrylic foam adhesive.

24. The gradient permittivity film of claim 21 wherein the second permittivity layer comprises a second continuous matrix of a fourth material having a fourth relative permittivity ($\varepsilon_{r4}$) and a fifth component having a fifth relative permittivity ($\varepsilon_{r5}$) dispersed in the second continuous matrix.

25. The gradient permittivity film of claim 21 wherein $\varepsilon_1$ is from 1.3 to 1.6.

26. The gradient permittivity film of any of claim 21 wherein $\varepsilon_2$ is from 1.9 to 2.6.

27. The gradient permittivity film of claim 21 wherein f is within a frequency range between 20 GHz and 120 GHz.

28. The gradient permittivity film of claim 27 wherein f is within a frequency range between 20 GHz and 100 GHz.

29. The gradient permittivity film of claim 28 wherein f is within a frequency range between 20 GHz and 81 GHz.

30. The gradient permittivity film of claim 29 wherein f is within a frequency range between 76 GHz and 81 GHz.

31. The gradient permittivity film of claim 29 wherein f is within a frequency range between 20 GHz and 30 GHz.

32. The gradient permittivity film of claim 21 wherein $T_1$ is from 1400 μm to 2400 um and $T_2$ is from 400 pm to 900 μm.

33. The gradient permittivity film of claim 32 wherein $T_1$ is from 1600 μm to 1800 μm and $T_2$ is from 650 μm to 900 μm.

34. The gradient permittivity film of claim 21 wherein the second component is disposed within a third component having a third relative permittivity ($\varepsilon_{r3}$) and $\varepsilon_{r2} \leq \varepsilon_{r3}$ for the frequency f.

35. The gradient permittivity film of claim 34 wherein the third component is glass and the second component is air.

36. The gradient permittivity film of claim 21 wherein the first component includes a polymeric material.

37. The gradient permittivity film of claim 21 wherein the first continuous matrix is a nonwoven material.

38. The gradient permittivity film of claim 21 wherein the second component is air.

39. The gradient permittivity film of claim 21 wherein the first permittivity layer is laminated to the second permittivity layer.

40. The gradient permittivity film of claim 21 further comprising a backing layer disposed on the second permittivity layer opposing the first permittivity layer.

41. An assembly comprising the gradient permittivity film of claim 1 or 21 attached to a vehicle bumper fascia.

42. The assembly of claim 41 wherein, at a location of attachment of the gradient permittivity film to the vehicle bumper fascia, a relative permittivity of the vehicle bumper fascia is within 10% of $\varepsilon_1$.

43. The assembly of claim 42 wherein the relative permittivity of the vehicle bumper fascia is within 5% of $\varepsilon_1$.

44. An assembly comprising the gradient permittivity film of claim 1 or 21 attached to an automobile radome.

45. The assembly of claim 44 wherein, at a location of attachment of the gradient permittivity tape and the automobile radome, a relative permittivity of the automobile radome is within 10% of $\varepsilon_1$.

46. The assembly of claim 45, wherein the relative permittivity of the automobile radome is within 5% of $\varepsilon_1$.

* * * * *

UNITED STATES PATENT AND TRADEMARK OFFICE
CERTIFICATE OF CORRECTION

PATENT NO. : 11,637,367 B2
APPLICATION NO. : 17/045559
DATED : April 25, 2023
INVENTOR(S) : Mohsen Salehi et al.

Page 1 of 1

It is certified that error appears in the above-identified patent and that said Letters Patent is hereby corrected as shown below:

In the Claims

Column 18
Line 36, In Claim 6, delete "film of any claim 1" and insert -- film of claim 1 --, therefor.
Line 48, In Claim 12, delete "film of any of claim 1" and insert -- film of claim 1 --, therefor.

Column 20
Line 1, In Claim 26, delete "film of any of claim 21" and insert -- film of claim 21 --, therefor.

Signed and Sealed this
Twenty-fourth Day of October, 2023

Katherine Kelly Vidal
*Director of the United States Patent and Trademark Office*